United States Patent
Wang et al.

(10) Patent No.: US 11,876,628 B2
(45) Date of Patent: Jan. 16, 2024

(54) FALLBACK RETRANSMISSION IN SIDELINK

(71) Applicant: QUALCOMM Incorporated, San Diego, CA (US)

(72) Inventors: Hua Wang, Basking Ridge, NJ (US); Piyush Gupta, Bridgewater, NJ (US); Junyi Li, Franklin Park, NJ (US); Lik Hang Silas Fong, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 17/157,575

(22) Filed: Jan. 25, 2021

(65) Prior Publication Data
US 2021/0288763 A1    Sep. 16, 2021

Related U.S. Application Data

(60) Provisional application No. 62/988,525, filed on Mar. 12, 2020.

(51) Int. Cl.
 H04L 1/1867 (2023.01)
 H04W 24/08 (2009.01)
 (Continued)

(52) U.S. Cl.
 CPC ......... H04L 1/1896 (2013.01); H04B 17/336 (2015.01); H04W 24/08 (2013.01); H04W 72/20 (2023.01); *H04W 92/18* (2013.01)

(58) Field of Classification Search
 CPC ................ H04L 1/1896; H04L 1/1887; H04L 2001/0097; H04L 1/1671; H04B 17/336;
 (Continued)

(56) References Cited

U.S. PATENT DOCUMENTS

2009/0213822 A1 * 8/2009 Keshavarzian ......... H04W 8/04
370/338
2012/0163357 A1    6/2012 Won et al.
(Continued)

FOREIGN PATENT DOCUMENTS

EP          2075972 A1 *  7/2009  ........... H04L 1/0026
WO       2010005951 A2     1/2010
WO    WO-2021079599 A1 *  4/2021

OTHER PUBLICATIONS

International Search Report and Written Opinion—PCT/US2021/015089—ISA/EPO—dated Apr. 23, 2021.

*Primary Examiner* — Peter P Chau
(74) *Attorney, Agent, or Firm* — Patterson + Sheridan, L.L.P.

(57) ABSTRACT

Certain aspects of the present disclosure provide techniques for a fallback retransmission for a sidelink. A method that may be performed by a user equipment (UE) includes monitoring a transmission from a node. The UE can determine that the transmission was not successfully decoded. The UE can send a feedback message to the node indicating that the transmission was not successfully decoded. The feedback message can also include an indication of whether the node or a base station (BS) retransmits the transmission. The node retransmits the transmission or indicates to the BS to retransmit based on the feedback message. The BS can configure the node, the UE, or both with one or more thresholds for determining whether the node or the BS retransmits the transmission.

19 Claims, 21 Drawing Sheets

(51) Int. Cl.
 *H04B 17/336* (2015.01)
 *H04W 72/20* (2023.01)
 *H04W 92/18* (2009.01)

(58) Field of Classification Search
 CPC ............... H04B 17/373; H04W 24/08; H04W 72/0406; H04W 92/18
 See application file for complete search history.

(56) References Cited

U.S. PATENT DOCUMENTS

| | | |
|---|---|---|
| 2014/0289581 A1 | 9/2014 | Maret et al. |
| 2017/0141903 A1 | 5/2017 | Xu et al. |
| 2021/0021536 A1* | 1/2021 | Ganesan ............ H04W 72/1278 |
| 2021/0376894 A1* | 12/2021 | Cha ....................... H04B 7/0619 |

* cited by examiner

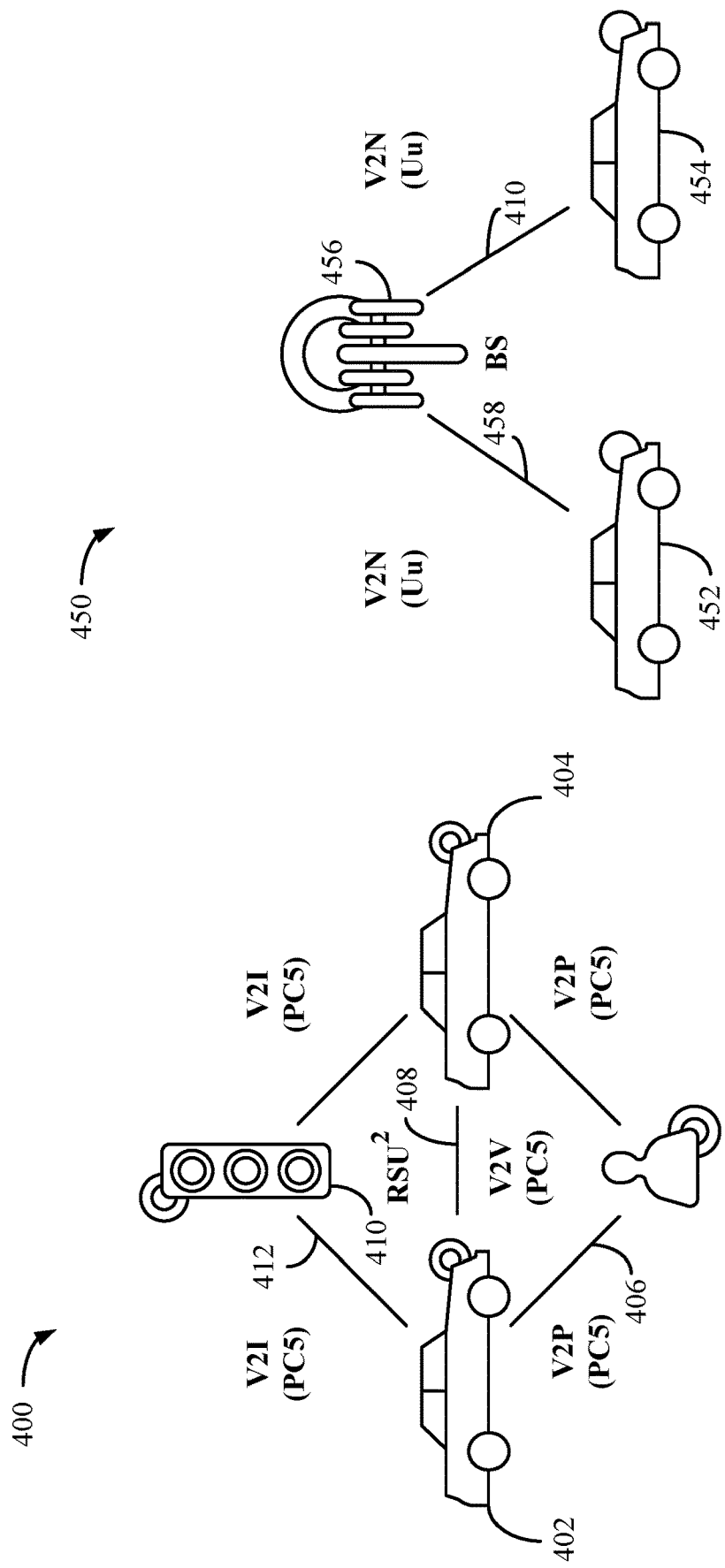

FALLBACK RETRANSMISSION IN SIDELINK

CROSS-REFERENCE TO RELATED APPLICATION

This application claims benefit of and priority to U.S. Provisional Patent Application No. 62/988,525, filed Mar. 12, 2020, which is hereby incorporated by reference in its entirety.

BACKGROUND

Field of the Disclosure

Aspects of the present disclosure relate to wireless communications, and more particularly, to techniques for fallback retransmission in a sidelink.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved and desirable fallback retransmission in a sidelink.

Certain aspects of the subject matter described in this disclosure can be implemented in an apparatus for wireless communication at least one processor and a memory coupled to the at least one processor. The memory comprising code executable by the at least one processor to cause the apparatus to monitor a transmission from a node; determine that the transmission was not successfully decoded; and send a feedback message to the node indicating that the transmission was not successfully decoded, wherein the feedback message further indicates whether the node or a base station (BS) retransmits the transmission.

Certain aspects of the subject matter described in this disclosure can be implemented in an apparatus for wireless communication at least one processor and a memory coupled to the at least one processor. The memory comprising code executable by the at least one processor to cause the apparatus to send a transmission to a user equipment (UE); receive a feedback message from the UE indicating that the transmission was not successfully decoded, wherein the feedback message further indicates whether the apparatus or a BS retransmits the transmission; and based on the feedback message, retransmit the transmission or indicate to the BS to retransmit the transmission.

Certain aspects of the subject matter described in this disclosure can be implemented in an apparatus for wireless communication at least one processor and a memory coupled to the at least one processor. The memory comprising code executable by the at least one processor to cause the apparatus to send a transmission to a node for forwarding to a UE; and configure the node, the UE, or both with one or more thresholds for determining whether the node or the apparatus retransmits the transmission.

Certain aspects of the subject matter described in this disclosure can be implemented in a method for wireless communication by a UE. The method may include monitoring a transmission from a node; determining that the transmission was not successfully decoded; and sending a feedback message to the node indicating that the transmission was not successfully decoded, wherein the feedback message further indicates whether the node or a BS retransmits the transmission.

Certain aspects of the subject matter described in this disclosure can be implemented in a method for wireless communication by a node. The method may include sending a transmission to a UE; receiving a feedback message from the UE indicating that the transmission was not successfully decoded, wherein the feedback message further indicates whether the apparatus or a BS retransmits the transmission; and based on the feedback message, retransmitting the transmission or indicating to the BS to retransmit the transmission.

Certain aspects of the subject matter described in this disclosure can be implemented in a method for wireless communication by a BS. The method may include sending a transmission to a node for forwarding to a UE; and configuring the node, the UE, or both with one or more thresholds for determining whether the node or the BS retransmits the transmission.

Certain aspects of the subject matter described in this disclosure can be implemented in an apparatus for wireless communication. The apparatus may include means for monitoring a transmission from a node; means for determining that the transmission was not successfully decoded; and means for sending a feedback message to the node indicating that the transmission was not successfully decoded, wherein the feedback message further indicates whether the node or a BS retransmits the transmission.

Certain aspects of the subject matter described in this disclosure can be implemented in an apparatus for wireless communication. The apparatus may include means for sending a transmission to a UE; means for receiving a feedback message from the UE indicating that the transmission was not successfully decoded, wherein the feedback message further indicates whether the apparatus or a BS retransmits the transmission; and based on the feedback message, means for retransmitting the transmission or indicating to the BS to retransmit the transmission.

Certain aspects of the subject matter described in this disclosure can be implemented in an apparatus for wireless communication. The apparatus may include means for sending a transmission to a node for forwarding to a UE; and means for configuring the node, the UE, or both with one or more thresholds for determining whether the node or the apparatus retransmits the transmission.

Certain aspects of the subject matter described in this disclosure can be implemented in a computer readable medium storing computer executable code thereon for wireless communication by a UE. The computer readable medium may include code for monitoring a transmission from a node; code for determining that the transmission was not successfully decoded; and code for sending a feedback message to the node indicating that the transmission was not successfully decoded, wherein the feedback message further indicates whether the node or a BS retransmits the transmission.

Certain aspects of the subject matter described in this disclosure can be implemented in a computer readable medium storing computer executable code thereon for wireless communication by a node. The computer readable medium may include code for sending a transmission to a UE, code for receiving a feedback message from the UE indicating that the transmission was not successfully decoded, wherein the feedback message further indicates whether the apparatus or a BS retransmits the transmission; and based on the feedback message, code for retransmitting the transmission or indicating to the BS to retransmit the transmission.

Certain aspects of the subject matter described in this disclosure can be implemented in a computer readable medium storing computer executable code thereon for wireless communication by a BS. The computer readable medium may include code for sending a transmission to a node for forwarding to a UE; and code for configuring the node, the UE, or both with one or more thresholds for determining whether the node or the BS retransmits the transmission.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 4A and FIG. 4B show diagrammatic representations of example vehicle to everything (V2X) systems, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
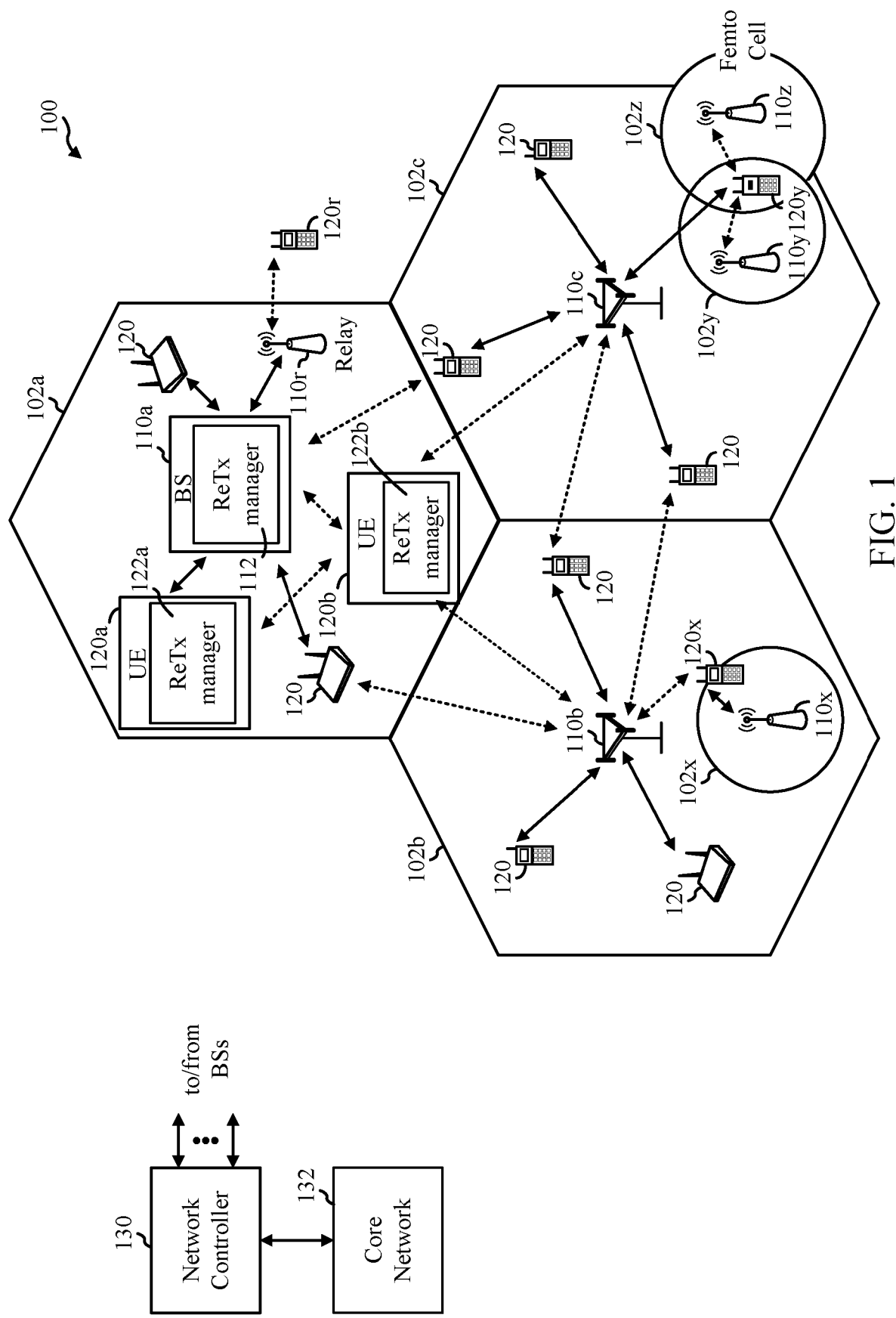
FIG. 1 is a block diagram conceptually illustrating an example wireless communication network, in accordance with certain aspects of the present disclosure.

Aspects of the present disclosure provide apparatus, methods, processing systems, and computer readable mediums for a fallback retransmission in a sidelink.

In certain systems, such as an industrial internet-of-things (IIOT) system, a sidelink user equipment (UE) may receive transmissions from a base station (BS) or a programmable logic controller (PLC). In some cases, if the UE does not receive a transmission from the PLC, it may be desirable for the PLC to resend the transmission and in some cases it may be desirable for the BS to resend the transmission.

Aspects of the present disclosure provide techniques and apparatus for the UE to indicate whether the PLC or the BS sends a retransmission. In some examples, the UE requests the PLC or BS to send the retransmission. In some examples, the UE sends information to the PLC and, based on the information, the PLC determines whether the PLC or the BS sends the retransmission. The information may include decoding information associated with the initial transmission that was not successfully decoded.

The following description provides examples of fallback retransmission in the sidelink in wireless communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Example Wireless Communications System

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. Multiple input multiple output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be a new radio (NR) system (e.g., a 5G NR network). As shown in FIG. 1, the wireless communication network 100 may be in communication with a core network 132. The core network 132 may in communication with one or more base station (BSs) 110 and/or user equipments (UEs) 120 in the wireless communication network 100 via one or more interfaces.

According to certain aspects, the BSs 110 and the UEs 120, which may include a programmable logic controller (PLC), may be configured for a fallback retransmission in a sidelink. As shown in FIG. 1, a BS 110*a* includes a retransmission manager 112, a UE 120*a* includes a retransmission manager 122*a*, and a UE 120*b* includes a retransmission manager 122*b*. The retransmission manager 112, the retransmission manager 122*a*, and/or the retransmission manager 122*b* may be configured for the fallback retransmission, in accordance with aspects of the present disclosure.

As illustrated in FIG. 1, the wireless communication network 100 may include a number of BSs 110*a*-*z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs 110 or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. ABS 110 may support one or multiple cells.

The BSs 110 communicate with UEs 120*a*-*y* (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. The wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between the UEs 120, to facilitate communication between devices.

A network controller 130 may be in communication with a set of BSs 110 and provide coordination and control for these BSs 110 (e.g., via a backhaul). In aspects, the network controller 130 may be in communication with the core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
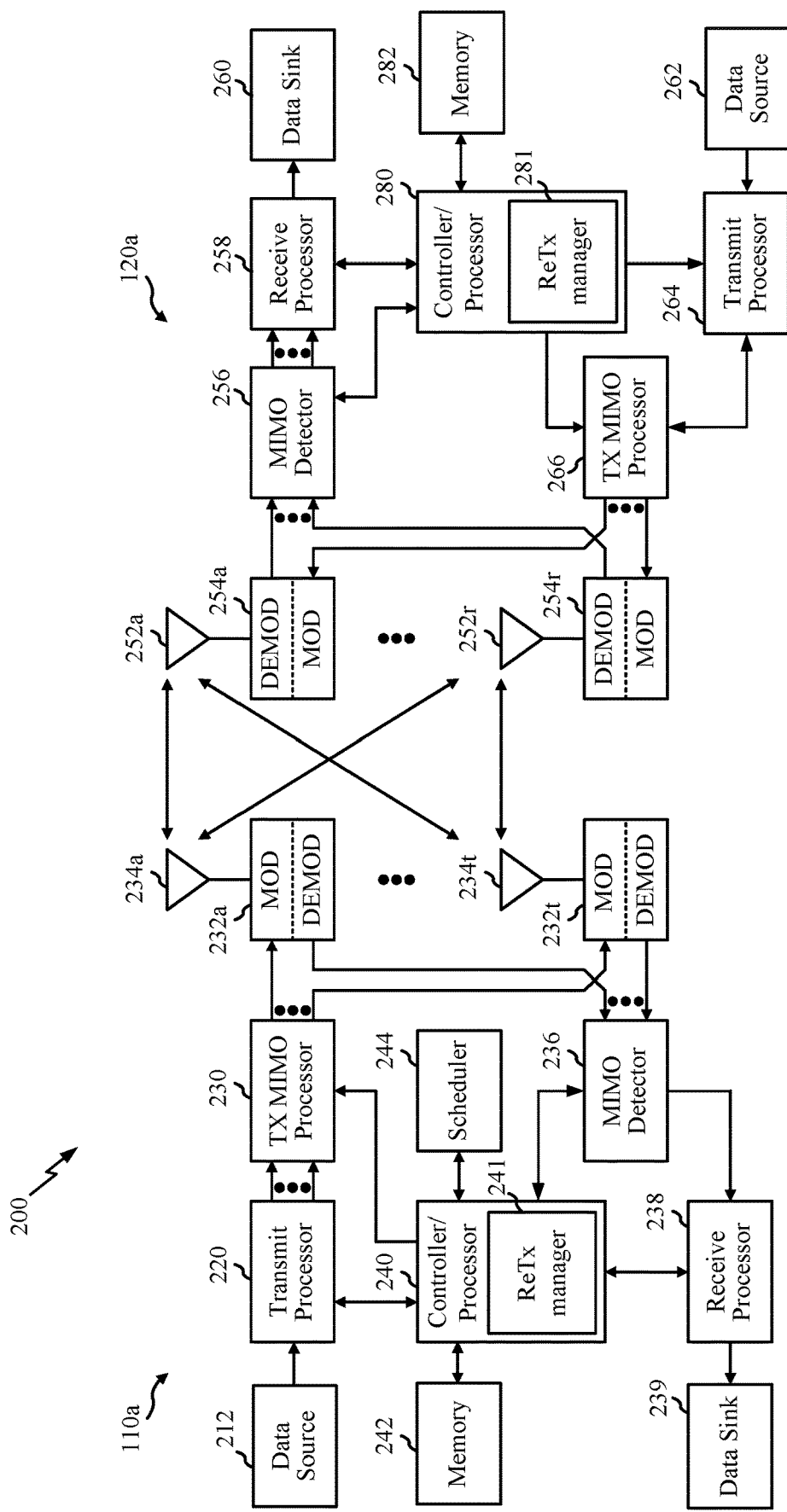
FIG. 2 is a block diagram conceptually illustrating a design of an example a base station (BS) and user equipment (UE), in accordance with certain aspects of the present disclosure.

FIG. 2 illustrates example components of a BS 110a and a UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ indicator channel (PHICH), physical downlink control channel (PDCCH), a group common PDCCH (GC PDCCH), etc. The data may be for a physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) data and control information to obtain data symbols and control symbols, respectively. The transmit processor 220 may also generate reference symbols, such as for a primary synchronization signal (PSS), a secondary synchronization signal (SSS), a PBCH demodulation reference signal (DMRS), and a channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for OFDM, etc.) to obtain an output sample stream. Each MOD in transceivers 232a-232t may further process (e.g., convert to analog, amplify, filter, and upconvert) the output sample stream to obtain a downlink signal. Downlink signals from MODs in transceivers 232a-232t may be transmitted via antennas 234a-234t, respectively.

At the UE 120a, antennas 252a-252r may receive downlink signals from the BS 110a and may provide received signals to demodulators (DEMODs) in transceivers 254a-254r, respectively. Each DEMOD in transceivers 254a-254r may condition (e.g., filter, amplify, downconvert, and digitize) a respective received signal to obtain input samples.

Each DEMOD in transceivers 254a-254r may further process the input samples (e.g., for OFDM, etc.) to obtain received symbols. A MIMO detector 256 may obtain received symbols from all the DEMODs in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at the UE 120a, a transmit processor 264 may receive and process data (e.g., for the PUSCH) from a data source 262 and control information (e.g., for a physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the DEMODs in transceivers 254a-254r (e.g., for SC-FDM, etc.), and transmitted to the BS 110a. At the BS 110a, the uplink signals from the UE 120a may be received by the antennas 234, processed by the MODs in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or the uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a retransmission manager 241 and the controller/processor 280 of the UE 120a has a retransmission manager 281 configured for a fallback retransmission, according to aspects described herein. Although shown at the controller/processor, other components of the UE 120a and the BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
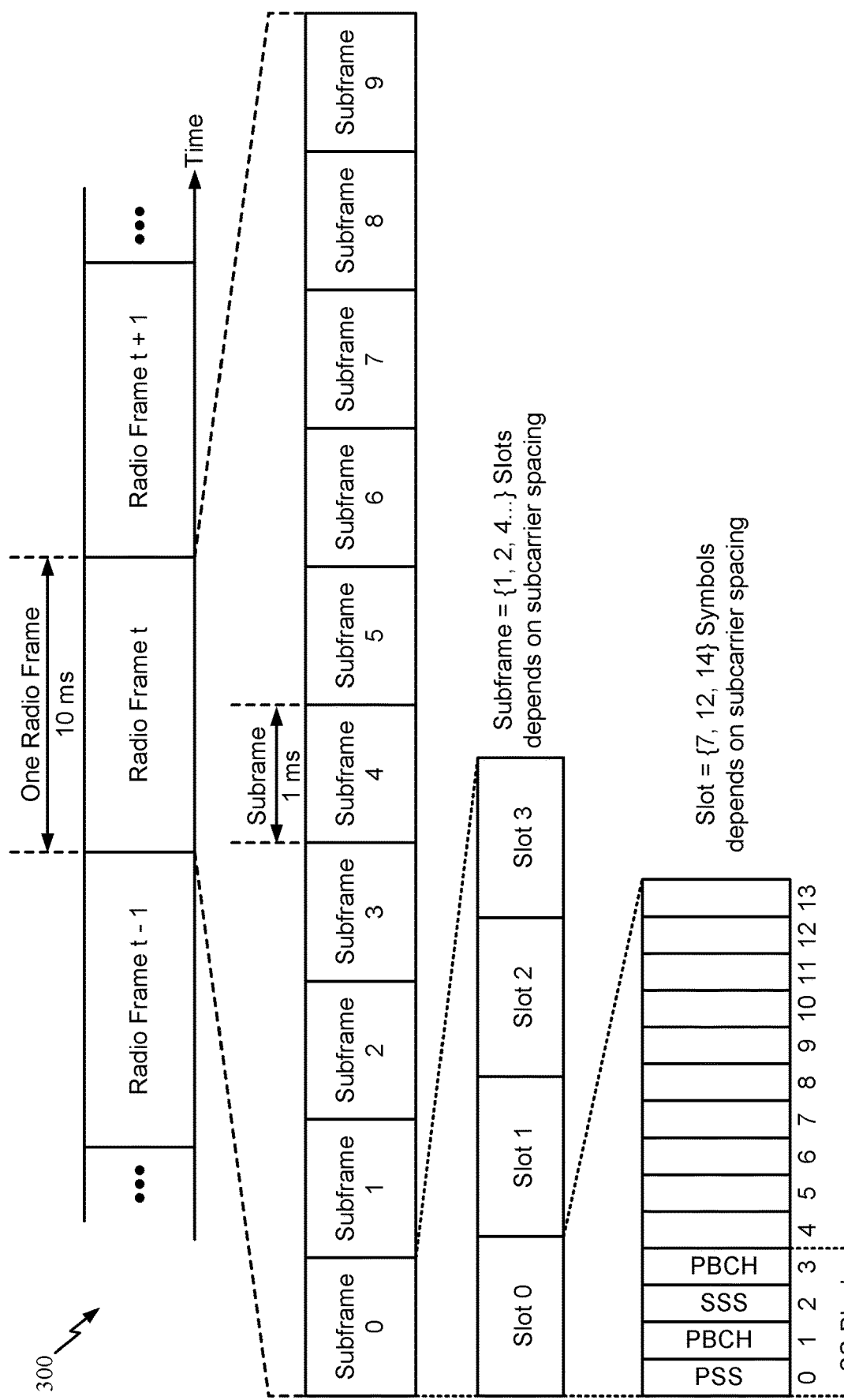
FIG. 3 is an example frame format for certain wireless communication systems (e.g., a new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

FIG. 4A and FIG. 4B show diagrammatic representations of example V2X systems, in accordance with some aspects of the present disclosure. For example, vehicles shown in FIG. 4A and FIG. 4B may communicate via sidelink channels and may perform sidelink CSI reporting as described herein.

The V2X systems, provided in FIG. 4A and FIG. 4B provide two complementary transmission modes. A first transmission mode, shown by way of example in FIG. 4A, involves direct communications (for example, also referred to as side link communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles 402 and 404. The V2X system 400 may be configured to operate in a licensed or unlicensed spectrum, thus any vehicle from the vehicles 402 and 404 with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 110a), that sends and receives information to and from (for example, relays information between) the vehicles 452 and 454. The network communications through vehicle to network (V2N) links 458 and 410 may be used, for example, for long range communications between vehicles 452 and 454, such as for communicating the presence of a car accident a distance ahead along a road or highway. Other types of communications may be sent by the wireless node to the vehicles 452 and 454, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

In some examples, a sidelink is used in industrial internet-of-things (IIOT) systems. IIOT may be performed in connection with factory automation. An IIOT system may include a sensor, an actuator, a piece of industrial equipment, etc. A programmable logic controller (PLC) may receive information from such sensor(s)/actuator(s) and may provide commands to the sensor(s)/actuator(s) or to factory equipment associated with the sensor(s)/actuator(s). For example, the PLC may automate control of machines and control systems of industrial electromechanical processes, such as controlling machinery on factory assembly lines, amusement rides, light fixtures, etc. Additionally, latency and reliability targets in IIOT systems may be stringent. For example, IIOT may target a latency of around 1-2 ms or less and a reliability of around $10^{-5}$ to $10^{-6}$, such as 99.9999% reliability, or better for both data and control channels.

Figure 5A:
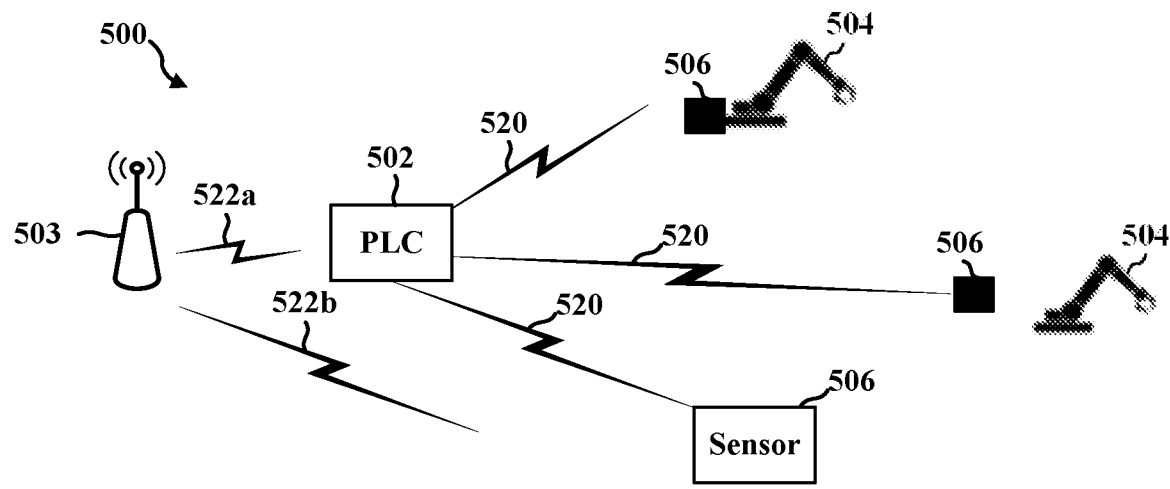
FIG. 5A illustrates an example wireless communication system including a BS, a programmable logic controller (PLC), and sensor(s)/actuator(s), in accordance with certain aspects of the present disclosure.

FIG. 5A illustrates an example communication system 500 including a PLC 502 that exchanges a wireless communication 520 with sensors/actuators 506 that may be associated with an equipment 504. The communication system 500 may also include a BS 503 that exchanges a communication 522a with the PLC 502 and/or a communication 522b with the sensors/actuators 506. The communication 520 between the PLC 502 and the sensor(s)/actuator(s) 506 may include cyclic exchanges of information. The PLC 502 may potentially exchange cyclic information with a large number of the sensors/actuators 506. In some aspects, the PLC 502 may transmit data, either uplink data or sidelink data, to the sensor(s)/actuator(s) 506. In some examples, the BS 503 may include a 5G NR BS, such as a gNB.

Figure 5B:
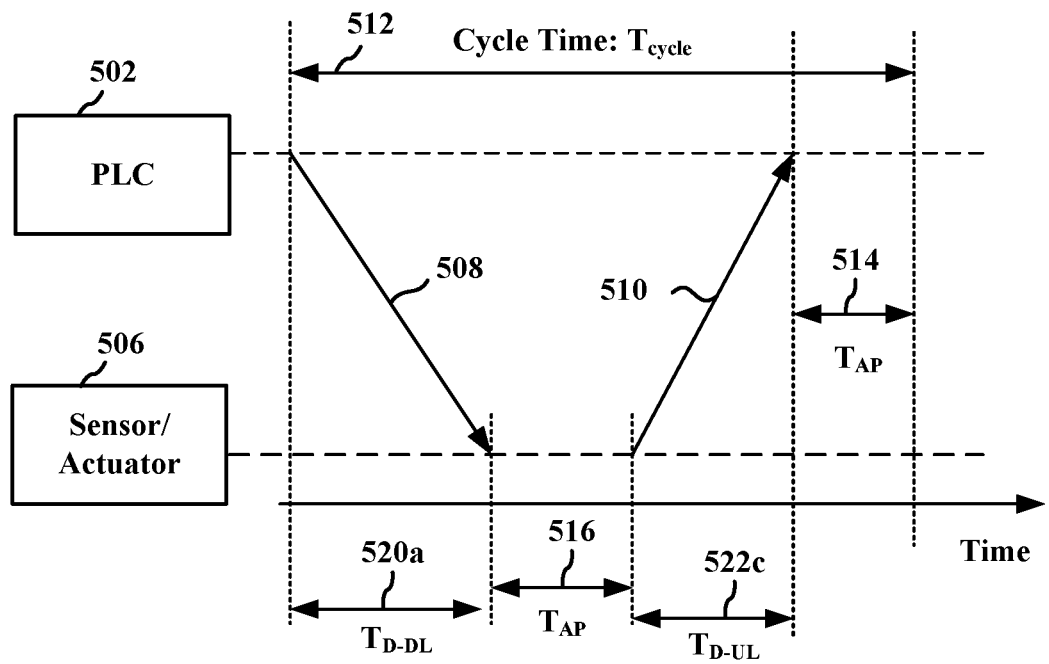
FIG. 5B illustrates an example communication cycle between a PLC, and a sensor/actuator, in accordance with certain aspects of the present disclosure

In some examples, a semi-persistent scheduling (SPS) may be used. FIG. 5B illustrates an example of periodic or cyclic traffic that may be exchanged between the PLC 502 and the sensor/actuator 506. The PLC 502 may transmit a communication 508 such as a command or other communication to the sensor/actuator 506 or the equipment 504 during a period of time $T_{D\text{-}DL}$ 520a. The communication 508 from the PLC 502 to the sensor/actuator 506 may be referred to as a downlink communication. The sensor/actuator 506 may receive the communication 508, and may take an action based on the command. Following the action, the sensor/actuator 506 may transmit a communication 510 back to the PLC 502 during a period of time $T_{D\text{-}UL}$, 522c. For example, the sensor/actuator 506 may respond with location information, temperature information, etc. The sensor/actuator 506 may report back to the PLC 502 a result that occurs due to an action from the command received from the PLC 502. The report may comprise an acknowledgement, e.g., a simple application layer acknowledgment. As well, the sensor/actuator 506 may report a current status of the sensor/actuator 506 following a command, e.g., an updated location, etc. There may be a processing time duration 516 (TAP) e.g., an actuation and/or sensing duration between receipt of the communication 508 from the PLC 502 and transmission of the communication 510 from the sensor/actuator 506. The communication 510 that is transmitted from the sensor/actuator 506 to the PLC 502 may be referred to as an uplink communication. Following the PLC's 502 receipt of the communication 510 from the sensor/actuator 506, there may be a processing duration 514 (TAP) during which the PLC 502 processes the received information, e.g., the communication 510, and before the PLC 502 sends additional communication/commands to the sensor/actuator 506. The combined cycle may have a duration 512 of length $T_{cycle}$. Following the duration TAP 514, the cycle may repeat with the PLC 502 sending additional communication 508 to the sensor/actuator 506. The communication system 500 may accommodate periodic, regular traffic between the PLC 502 and the sensors/actuators 506, e.g., downlink traffic from the PLC 502 to the sensors/actuators 506 and uplink traffic from the sensors/actuators 506 to the PLC 502.

Figure 6:
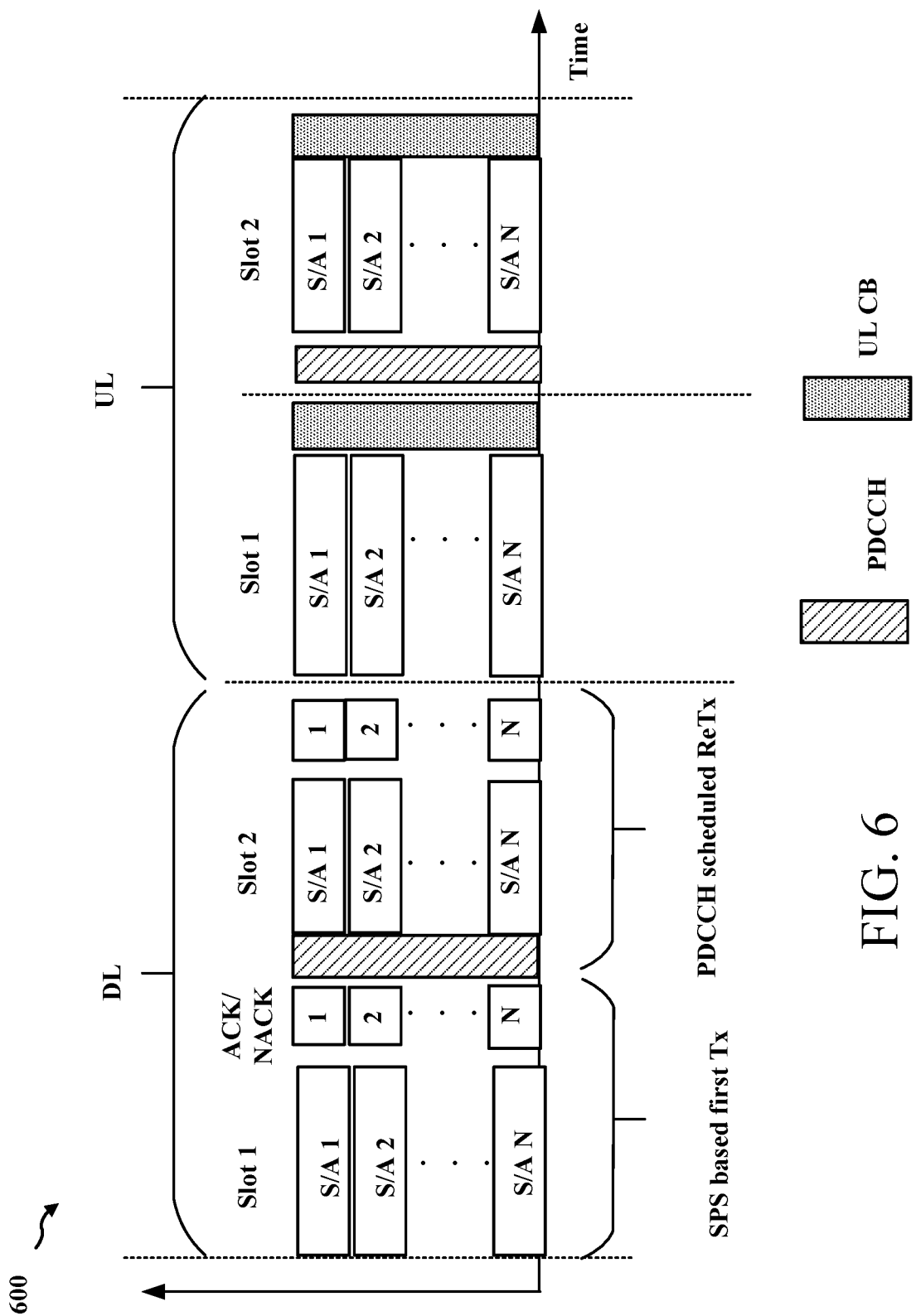
FIG. 6 illustrates examples semi-persistent scheduled and dynamically scheduled retransmissions in an industrial internet of things (IIOT) systems, in accordance with certain aspects of the present disclosure.

As shown in FIG. 6, SPS may be used for an initial transmission, and retransmissions may be dynamically scheduled. A PLC 502 (e.g., the PLC 502 of FIG. 5A and FIG. 5B) may use a control channel, such as a PDCCH, to grant resources to a sensor/actuator 506 (e.g., the sensor/actuator 506 of FIG. 5A and FIG. 5B) for use in transmitting periodic uplink communication 510 (e.g., the communication 510 of FIG. 5A and FIG. 5B). Factory automation may involve a high density, e.g., approximately 1 UE per m² of the sensor/actuator 506. Therefore, a large number of the sensors/actuators 506 may communicate with the PLC 502. Sending a dynamic grant, e.g., one DCI per slot, to each of the large number of the sensors/actuators 506 may place a burden on the PDCCH overhead. The SPS may be used to reduce the overhead requirements of the PDCCH by enabling the sensors/actuators 506 to be granted resources in a semi-persistent or periodic manner. The SPS may also be used to schedule resources for receiving downlink communication. The SPS may be communicated to each sensor/actuator 506 using RRC signaling and/or DCI. In some examples, the SPS may be used for a first transmission, and the PDCCH may be used to schedule a possible retransmission if the first transmission is not accurately received.

FIG. 6 illustrates a communication diagram 600 showing downlink transmissions from a PLC to a sensor/actuator 1 (S/A 1), a sensor/actuator 2 (S/A 2) and so forth until a downlink transmission for a sensor/actuator N (S/A N) in a slot 1 based on a SPS. ACK/NACK feedback is received from each of the sensors/actuators. Based on the feedback, the PLC may transmit a PDCCH to schedule resources for a retransmission of information to the sensors/actuators from which a NACK is received or from which an ACK is not received. For uplink communication, the PLC may receive uplink transmissions from the sensor/actuator 1 (S/A 1), the sensor/actuator 2 (S/A 2), . . . sensor/actuator N (S/A N) in a slot 1 based on the SPS. The PLC may provide the ACK/NACK feedback to each of the sensor/actuators. The PLC may transmit the PDCCH to the sensors/actuators scheduling a retransmission for information that was not correctly received by the PLC.

Figure 7:
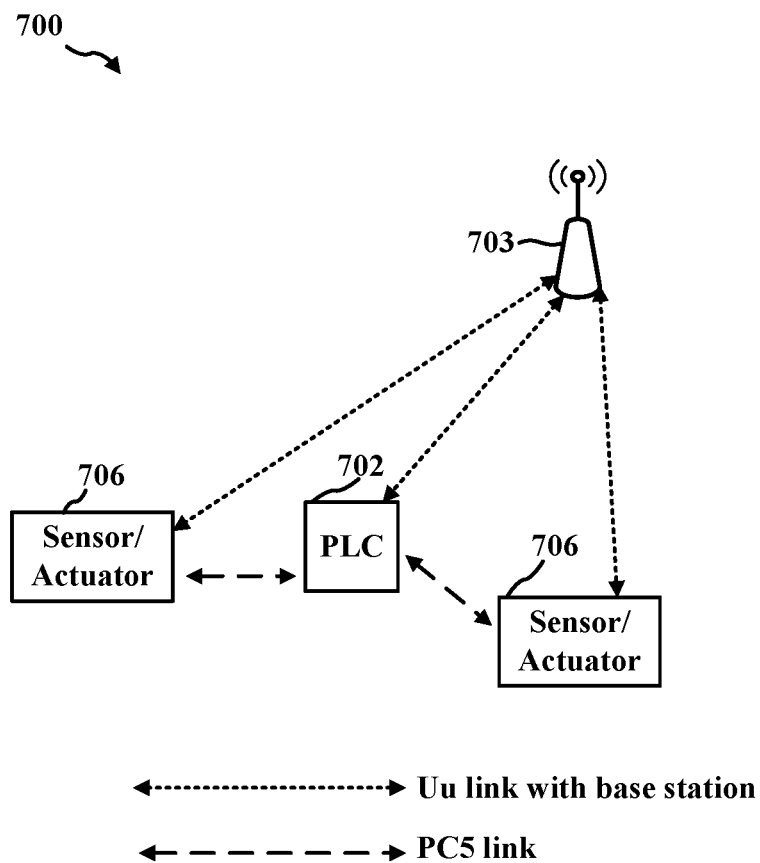
FIG. 7 is an example IIOT scenario, in accordance with certain aspects of the disclosure.
Figure 8:
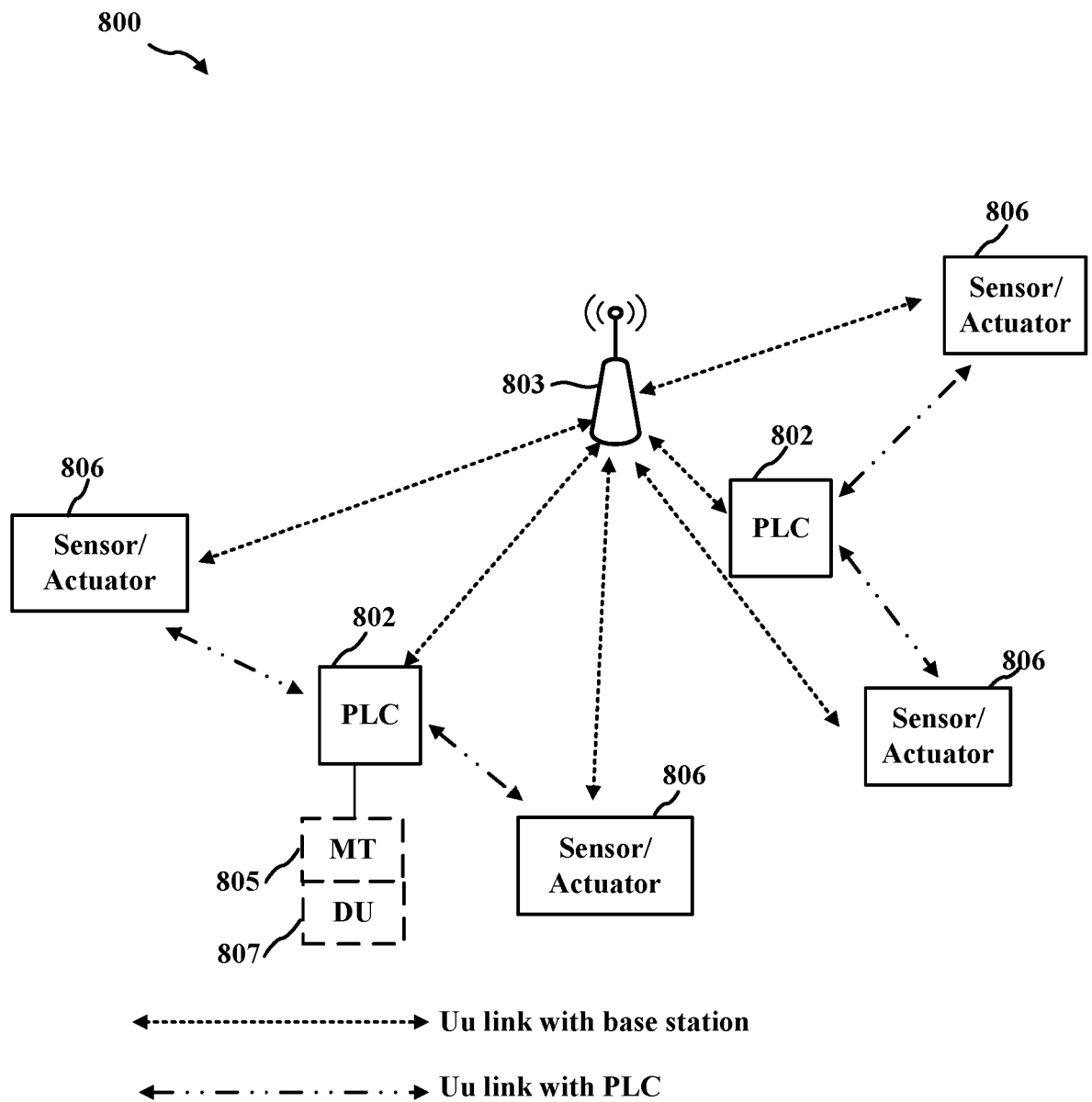
FIG. 8 is another example IIOT scenario, in accordance with certain aspects of the disclosure.

A wirelessly connected PLC may be located closer to a factory equipment. For example, PLCs may be located close to machinery, whereas a BS (e.g., a gNB) may be ceiling mounted or at a greater distance from the equipment. FIGS. 7 and 8 illustrate communication systems 700 and 800 that include one or more PLCs, multiple sensors/actuators, and a BS.

In some example modes, the BS may fully control the communication systems 700 and 800. In some example modes, the BS control may be relaxed. In FIG. 7, the communication system 700 includes a PLC 702, multiple sensors/actuators 706, and a BS 703. As illustrated, a link between the BS 703 and the PLC 702 may be based on a Uu interface. The links between the BS 703 and the sensors/actuators 706 may also be based on a Uu interface. The links between the PLC 702 and the sensors/actuators 706 may be based on a PC5 interface. The PLC 702 may operate similar to a UE or as a sidelink device. The PLC 702 may use the BS 703 for inter-PLC coordination with other PLCs. The PLC 702 may use the BS 703 for a backhaul to a human machine interface (HMI). The PLC 702 may use the BS 703 as a system controller. The BS 703 may perform interference management (IM) across multiple PLCs 702. The BS 703 may handle other network functions for the sensors/actuators 706, such as initial access with the network, mobility, etc. As the sensors/actuators 706 communicate with the PLC 702 based on sidelink and with the BS 703 based on uplink/downlink, the sensors/actuators 706 support both Uu and PC5 based communication. As the PLC 702 communicates with the sensors/actuators 706 based on sidelink and with the BS 703 based on uplink/downlink, the PLC 702 supports both Uu and PC5 based communication.

In some example relaxed BS modes, a PLC 802 may operate similar to a small cell or a relay node having a wireless backhaul to a BS 803. For example, as illustrated, in FIG. 8, the communication system 800 includes PLCs 802, multiple sensors/actuators 806, and a BS 803. As illustrated, a link between the BS 803 and the PLC 802 may be based on a Uu interface. The links between the BS 803 and the sensors/actuators 806 may be based on a Uu interface. The sensors/actuators 806 may interact with their respective PLC 802 based on a Uu interface. The PLCs 802 may use the BS 803 for inter-PLC coordination between PLCs 802, for a backhaul to an HMI, for a system controller, etc. The PLCs 802 may include aspects of an integrated access and backhaul (IAB) framework. The PLCs 802 may each operate based on dual roles. The PLCs 802 may each include a mobile termination (MT) component 805, e.g., that operates similar to a UE in receiving control/data from the BS 803. The PLCs 802 may each include a distributed unit (DU) component 807 that schedules resources for communication with their respective sensors/actuators 806 and that provides downlink communication to their respective sensors/actuators 806.

The transmission of control by the BS 803 may help to improve reliability. Such control by the BS 803 may involve two hops in order to provide the control to the sensor/actuator 806, e.g., a first hop from the PLC 802 to the BS 803 and a second hop from the BS 803 to the sensor/actuator 806. In some examples, a portion of scheduling for the sensors/actuators 806 may be provided by the BS 803, and another portion of the scheduling for the sensor/actuators 806 may be provided by the PLC 802. Providing some control directly from the PLC 802 may help to reduce over-the-air signaling and may improve latency. However, transmissions from the PLC 802 may be blocked for a particular sensor/actuator 806. Blocks of links between the PLCs 802 and various sensors/actuators 806 may last for different amounts of time.

Figure 9:
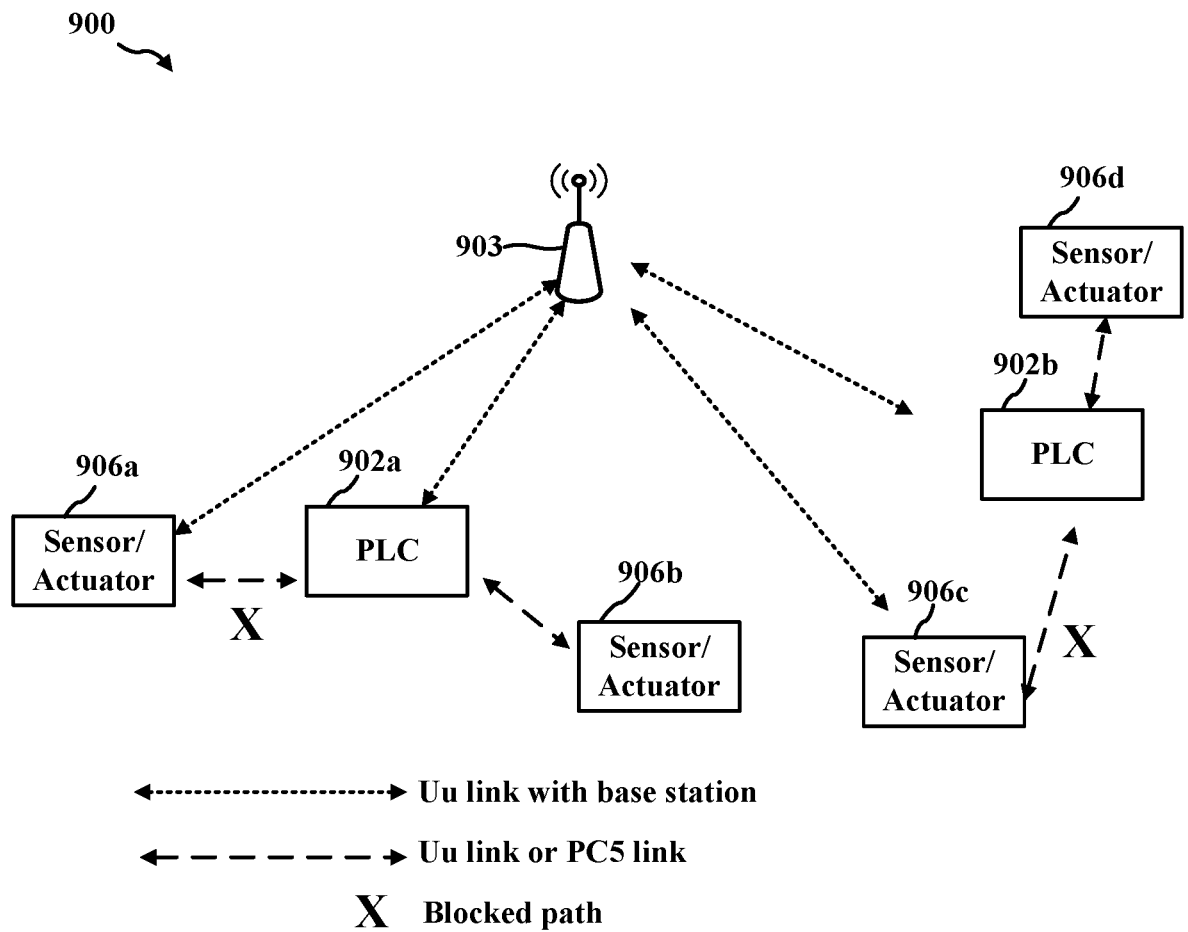
FIG. 9 is an example IIOT scenario illustrating retransmission by a BS, in accordance with certain aspects of the disclosure.

In some cases, a sidelink UE may not receive a transmission. For example, the transmission may be unsuccessfully decoded. In some examples, a hybrid mode of a fully BS controlled mode and a relaxed BS controlled mode may be used. FIG. 9 illustrates a communication system 900 that includes PLCs 902a and 902b, multiple sensors/actuators 906a, 906b, 906c, and 906d, and a BS 903. In FIG. 9, a transmission path between a PLC 902a and a sensor/actuator 906a is blocked, and a transmission path between a PLC 902b and a sensor/actuator 906c is blocked.

In FIG. 9, the PLC 902a may transmit a first transmission, e.g., based on SPS scheduling, directly to sensor/actuators 906a and 906b. The PLC 902b may transmit a first transmission to sensor/actuators 906c and 906d. The first transmission may be transmitted by the PLCs 902a and 902b directly to the sensor/actuators 906a, 906b, 906c, and 906d using sidelink as described in connection with FIG. 7 or as a downlink signal as described in connection with FIG. 8.

If a first transmission from a PLC from the PLCs 902a and 902b is not accurately received by a sensor/actuator from the multiple sensors/actuators 906a, 906b, 906c, and 906d, the BS 903 may send a retransmission. The BS 903 may receive the first transmission from the PLC and may receive feedback or a request for retransmission from the sensor/actuator. In response to the feedback or the request for the retransmission, the BS 903 may retransmit the first transmission that was initially transmitted by the PLC. For example, the BS 903 may receive the first transmission that is sent by the PLC 902a to the sensor/actuator 906a and the sensor/actuator 906b.

In a proactive approach, it may be predicted that the link the PLC and a UE is of poor quality for the transmission and the retransmission may be proactively scheduled. For example, based on the regular and periodic traffic patterns, a channel/link quality can be predicted.

In some examples, a blocked transmission may be identified based on a previous transmission failure between a PLC and a sensor/actuator, or a pattern of previous failures between the PLC and the sensor/actuator. A PLC-sensor/actuator link may then be determined to be more prone to failure or to have a lower quality for a data transmission.

In a reactive approach, a channel/link quality may not be predicted. Instead, the UE may send an acknowledgement feedback indicated whether the transmission was received and whether the retransmission is desired. As the transmission path between the PLC 902a and the sensor/actuator 906a is blocked, the sensor/actuator 906a may send a hybrid automatic repeat request (HARD) feedback, such as a negative acknowledgement (NACK), or may request the retransmission. The BS 903 may receive the NACK or the retransmission request from the sensor/actuator 906a and may retransmit the first transmission that the BS 903 received from the PLC 902a as a downlink transmission to the sensor/actuator 906a. Similarly, the BS 903 may provide the retransmission for the sensor/actuator 906c for the first transmission from the PLC 902b. The retransmission may be based on a scheduling from the respective PLC. The retransmission may be based on a PDCCH scheduling from the BS 903.

Although aspects are described for a BS 903 retransmission of a first transmission from a PLC of the PLCs 902a and 902b to a sensor/actuator from the multiple sensors/actuators 906a, 906b, 906c, and 906d, aspects may similarly be applied to missed transmissions from the sensor/actuator to the PLC. Thus, if the PLC does not correctly receive an uplink/sidelink transmission from the sensor actuator, the PLC may send a NACK or a request for a retransmission that is received by the BS 903. The BS 903 may respond by sending the retransmission of the uplink/sidelink transmission from the sensor/actuator as a downlink transmission from the BS 903 to the PLC. The communication system 900 may have reduced latency because the first transmission may be provided directly from the PLC 902a or 902b to the corresponding sensor/actuator 906a, 906b, 906c, or 906d and may also be received by the BS 903 so that the BS 903 can provide the retransmission.

In some cases, the UE may not successfully decode a transmission from the PLC 902a or 902b (e.g., relayed from the BS 903). However, it may be desirable that the BS 903 send the retransmission to the UE (e.g., directed via the Uu link). For example, if the link between the PLC and the UE is blocked, then it may be desirable that the BS 903 sends the retransmission to the UE directly.

Example Fallback Retransmission in Sidelink

Aspects of the present disclosure provide techniques and apparatus for a sidelink user equipment (UE) to indicate whether a node (e.g., a programmable logic controller (PLC)) or a base station (BS) sends a transmission (e.g., a retransmission of a failed transmission). In some examples, the UE requests the PLC or the BS to send the retransmission. In some examples, the UE sends information to the PLC and, based on the information, the PLC determines whether the PLC or the BS sends the retransmission. The information may include decoding information associated with the initial transmission that was not successfully decoded.

Figure 10:
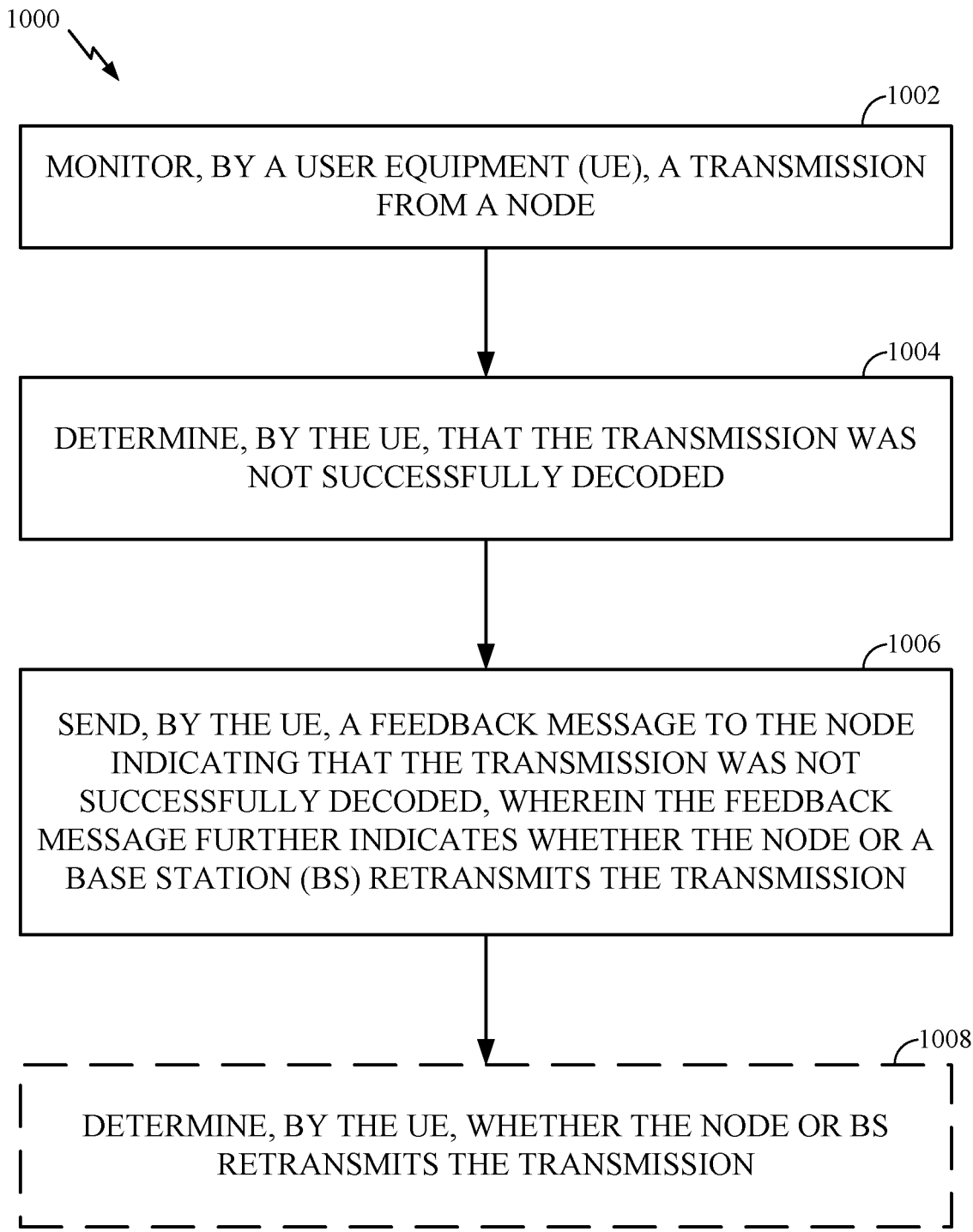
FIG. 10 is a flow diagram illustrating example operations for wireless communication by a UE, in accordance with certain aspects of the present disclosure.

FIG. 10 is a flow diagram illustrating example operations 1000 for a wireless communication, in accordance with certain aspects of the present disclosure. The operations 1000 may be performed, for example, by a UE (e.g., the UE 120a in the wireless communication network 100 of FIG. 1). The operations 1000 may be implemented as software components that are executed and run on one or more processors (e.g., the controller/processor 280 of FIG. 2). Further, transmission and reception of signals by the UE in operations 1000 may be enabled, for example, by one or more antennas (e.g., the antennas 252 of FIG. 2). In certain aspects, the transmission and/or the reception of signals by the UE may be implemented via a bus interface of one or more processors (e.g., the controller/processor 280 of FIG. 2) obtaining and/or outputting signals.

The operations 1000 may begin, at 1002, by the UE monitoring a transmission from a node. The UE may be an industrial internet-of-things (IIOT) device, a sidelink device, and/or a sensor/actuator. The node may be a PLC. The UE and the node may communicate via a cellular link, a sidelink, or both. The transmission may be a semi-persistent scheduled (SPS) transmission on the sidelink.

At 1004, the UE determines that the transmission was not successfully decoded.

At 1006, the UE sends a feedback message to the node indicating that the transmission was not successfully decoded. The feedback message further indicates whether the node or a BS retransmits the transmission.

In some examples, the feedback message includes decoding information for the transmission. The decoding information may indicate whether the node or the BS retransmits the transmission. The decoding information may include one or more signal-to-interference-plus-noise ratio (SINR) values and/or one or more log-likelihood ratio (LLR) values.

At 1008, the UE may determine whether the node or the BS retransmits the transmission. The feedback message then includes an indication of whether the node or the BS retransmits the transmission based on the determination by the UE. The determination may be based on the decoding information for the transmission. For example, the decoding information may include the one or more SINR values and/or the one or more LLR values.

In some examples, the UE receives an indication of one or more thresholds from the BS. The UE then determines whether the node or the BS retransmits the transmission based on the one or more thresholds. For example, the one or more thresholds may include one or more SINR thresholds and/or one or more LLR thresholds. When the decoding information satisfies a threshold, indicating a better decoding performance, the UE then determines that the node retransmits the transmission. When the decoding information fails to satisfy the threshold, indicating a worse higher decoding performance, the UE then determines that the BS retransmits the transmission. The one or more thresholds may be received via a medium access control (MAC) control element or a physical downlink control channel (PDCCH).

Figure 11:
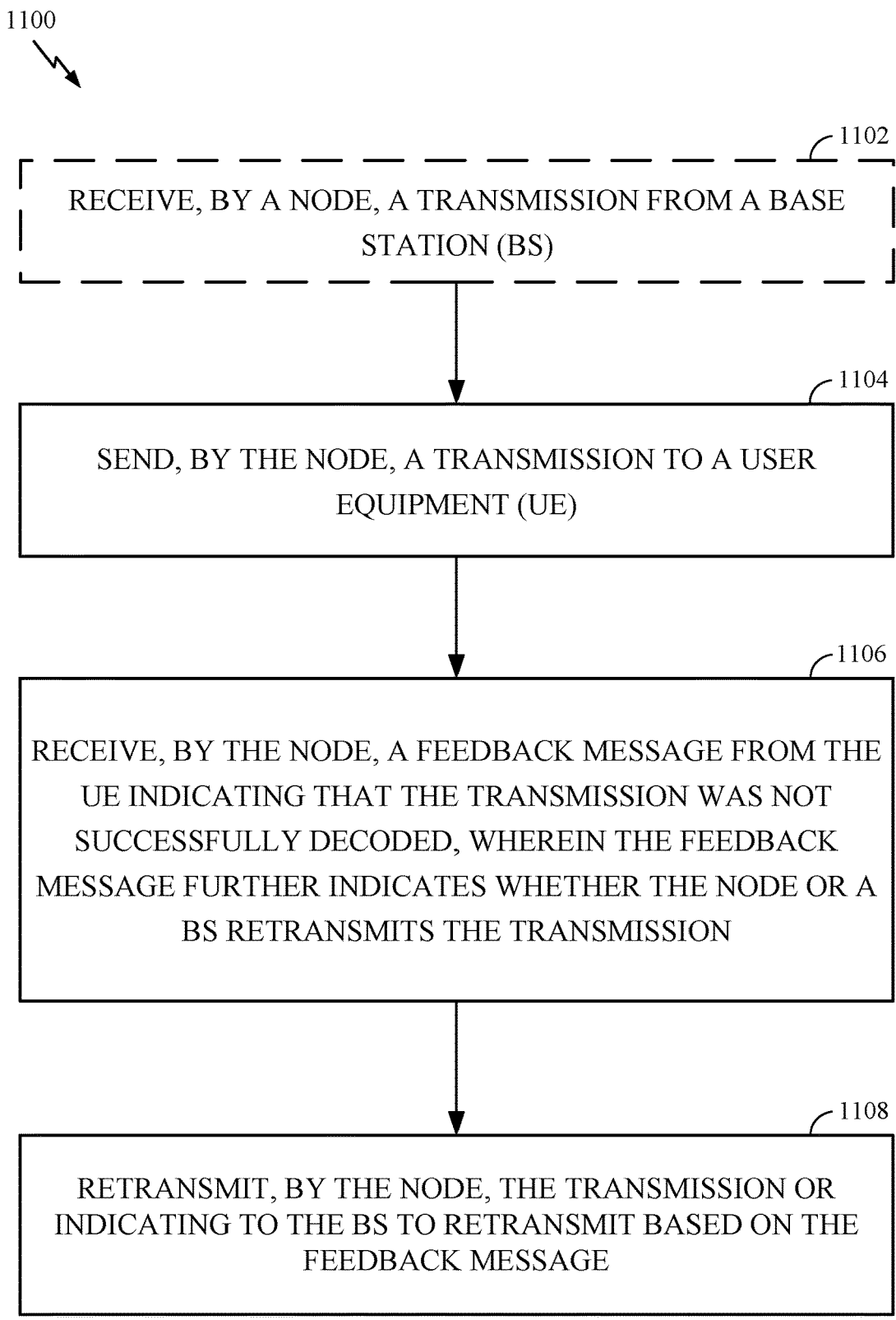
FIG. 11 is a flow diagram illustrating example operations for wireless communication by a node, in accordance with certain aspects of the present disclosure.

FIG. 11 is a flow diagram illustrating example operations 1100 for a wireless communication, in accordance with certain aspects of the present disclosure. The operations 1100 may be performed, for example, by a node (e.g., a PLC). The operations 1100 may be implemented as software components that are executed and run on one or more processors. Further, transmission and reception of signals by the node in operations 1100 may be enabled, for example, by one or more antennas. In certain aspects, the transmission and/or the reception of signals by a UE may be implemented via a bus interface of one or more processors obtaining and/or outputting signals.

The operations 1100 may begin, at 1102, by the node receiving a transmission from a BS to send the transmission to the UE.

At 1104, the node may send the transmission to the UE. The UE may be an IIOT device, a sidelink device, and/or a sensor/actuator. The node may be a PLC. The UE and the node may communicate via a cellular link, a sidelink, or both. The transmission may be a SPS transmission on the sidelink. In some examples, sending the transmission to the UE includes receiving the transmission from the BS and forwarding the transmission to the UE.

At 1106, the node receives a feedback message from the UE indicating that the transmission was not successfully decoded. The feedback message further indicates whether the node or a BS retransmits the transmission.

In some examples, the feedback message includes decoding information for the transmission. The node may determine whether the node or the BS retransmits the transmission based on the decoding information. The decoding information may include one or more SINR values and/or one or more LLR values.

In some examples, the node receives an indication of one or more thresholds from the BS. The node may make a determination whether the node or the BS retransmits the transmission based on the one or more thresholds. For example, when the decoding information satisfies a threshold, indicating a better decoding performance, the node then determines that the node retransmits the transmission. When the decoding information fails to satisfy the threshold, indicating a worse higher decoding performance, the node then determines that the BS retransmits the transmission. The one or more thresholds may include one or more SINR thresholds and/or one or more LLR thresholds. The one or more thresholds may be received via a MAC-CE or a PDCCH.

In some examples, the feedback message includes a bit indicating whether the node or the BS retransmits the retransmission.

At 1108, the node retransmits the transmission or indicates to the BS to retransmit the transmission based on the feedback message.

Figure 12:
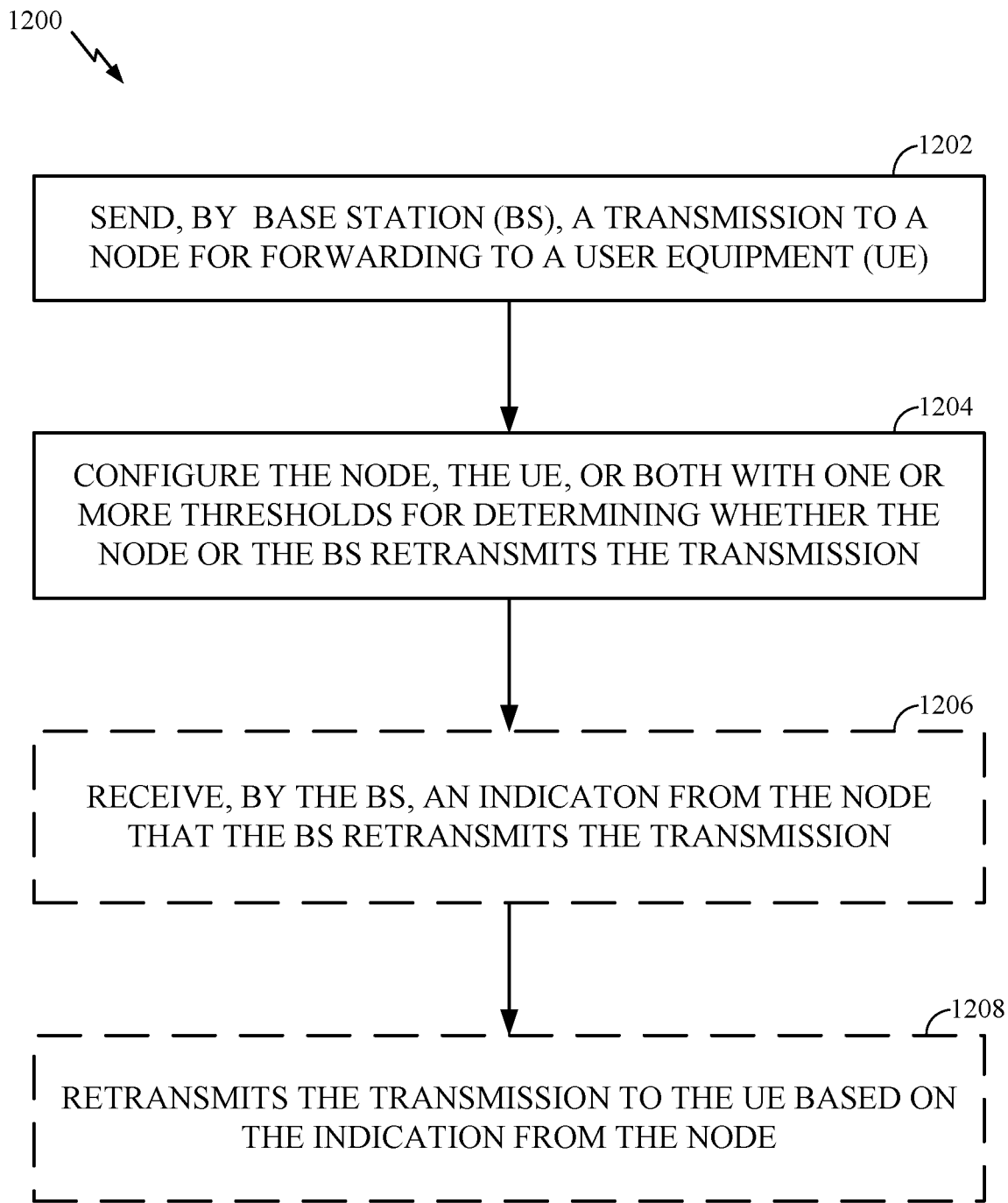
FIG. 12 is a flow diagram illustrating example operations for wireless communication by a BS, in accordance with certain aspects of the present disclosure.

FIG. 12 is a flow diagram illustrating example operations 1200 for a wireless communication, in accordance with certain aspects of the present disclosure. The operations 1200 may be performed, for example, by a BS (e.g., the BS 110a in the wireless communication network 100 of FIG. 1). The operations 1200 may be implemented as software components that are executed and run on one or more processors (e.g., the controller/processor 240 of FIG. 2). Further, transmission and reception of signals by the BS in operations 1200 may be enabled, for example, by one or more antennas (e.g., the antennas 234 of FIG. 2). In certain aspects, the transmission and/or the reception of signals by the BS may be implemented via a bus interface of one or more processors (e.g., the controller/processor 240) obtaining and/or outputting signals.

The operations 1200 may begin, at 1202, by the BS sending a transmission to a node for forwarding to a UE. The UE may be an IIOT device, a sidelink device, and/or a sensor/actuator. The node may be a PLC. The UE and the node may communicate via a cellular link, a sidelink, or both. The transmission may be a SPS transmission on the sidelink.

One or more thresholds may include thresholds for one or more decoding information values associated with the transmission. The one or more thresholds may include one or more SINR thresholds and/or one or more LLR thresholds. The one or more thresholds are configured via a MAC-CE or a PDCCH.

The BS may configure the UE and/or the node to determine the node retransmits the transmission when the one or more decoding information values satisfies a threshold, indicating a better decoding performance and to determine the BS retransmits the transmission when the one or more decoding information values fails to satisfy the threshold, indicating a better decoding performance.

At 1204, the BS configures the node, the UE, or both with the one or more thresholds for determining whether the node or the BS retransmits the transmission.

At 1206, the BS may send the transmission to the node for forwarding to the UE. The BS may receive an indication from the node that the BS retransmits the transmission.

At 1208, the BS retransmits the transmission to the UE (e.g., directly) based on the indication from the node.

According to certain aspects, when a transmission (e.g., from a PLC or a gNB) is not successfully decoded, a UE (e.g., a sidelink device or S/A) indicates to at least one device to retransmit the transmission. For example, the UE can indicate whether the PLC or the gNB retransmits the transmission. In some examples, a retransmission is done when a channel quality cannot be predicted.

In some examples, a UE provides additional information along with a negative acknowledgment (NACK) for a missed (e.g., failed, unsuccessfully decoded) transmission. The additional information may be used by a receiving device (e.g., the PLC or gNB) to determine the receiving device that retransmits the transmission.

In some examples, the additional information may include decoding information associated with the missed transmission. For example, the decoding information may include quantized bits of the UE's decoding information, such as one or more signal-to-interference noise ratios (SINRs) of a code block, one or more log-likelihood ratios (LLRs) of coded bits, and the like. In some examples, the PLC determines whether the retransmission is through the PLC or directly from the gNB. The determination may be based on the decoding information. For example, the PLC can compare information from all initial transmissions failed at UEs.

In some examples, a BS (e.g., a gNB) can send (e.g., configure, indicate) one or more thresholds for a PLC to determine that a retransmission should go through the PLC or through the gNB. For example, the gNB can send one or more SINR and/or LLR thresholds to the PLC. The thresholds may be sent via a MAC CE or a PDCCH.

Figure 13A:
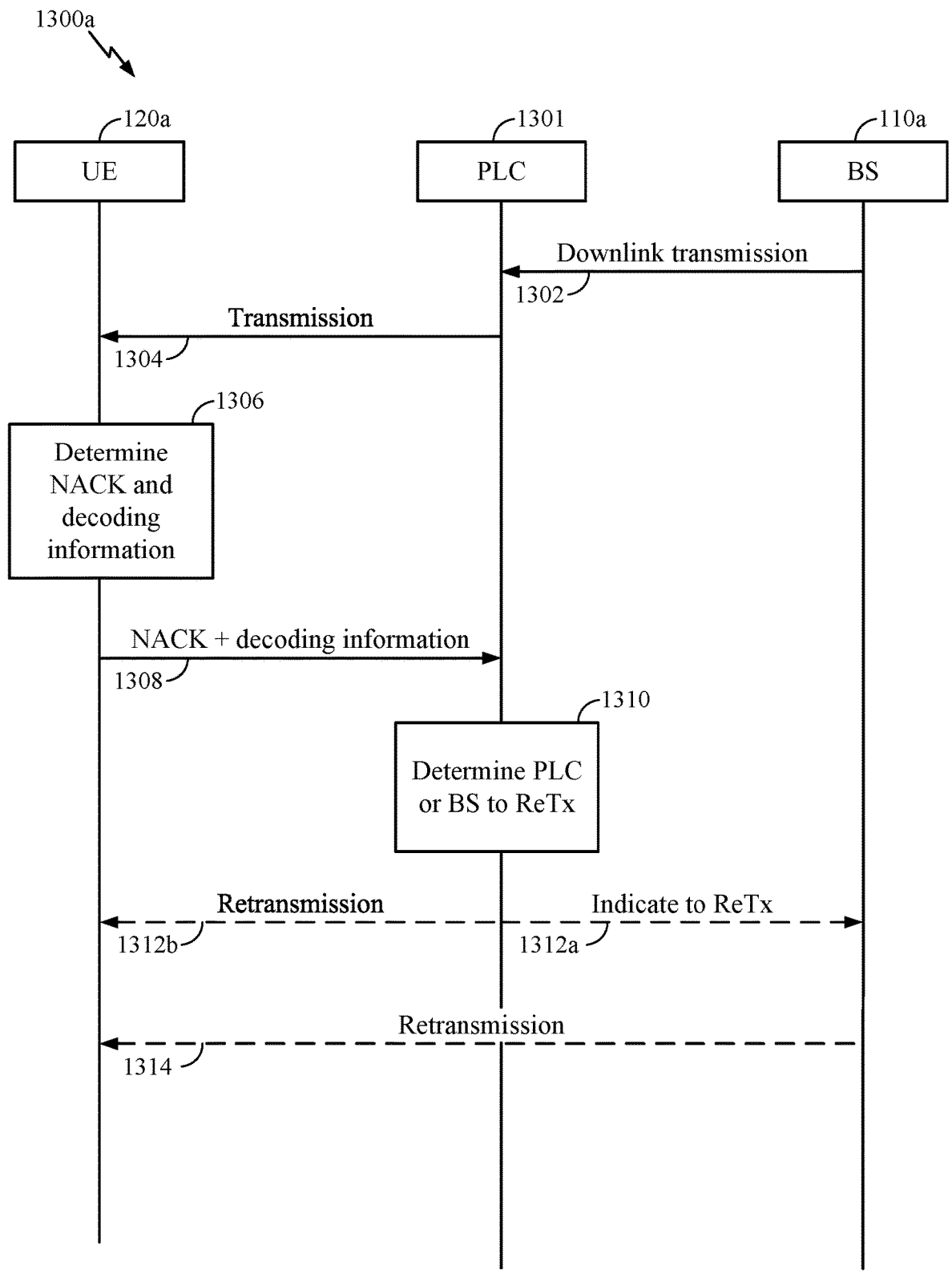
FIGS. 13A-C are call flow diagrams illustrating example signaling for a fallback retransmission in a sidelink, in accordance with certain aspects of the present disclosure.

FIG. 13A is a call flow diagram illustrating example signaling 1300a for a fallback retransmission for a sidelink, in accordance with aspects of the present disclosure. As shown in FIG. 13A, at 1304, a UE (e.g., such as the UE 120a of FIG. 1) may not successful decode a transmission from a BS (e.g., such as the BS 110a of FIG. 1), which may be forwarded by a PLC 1301 at 1302. At 1306, the UE 120a may determine that the transmission was not received (e.g., to send NACK) and the decoding information associated with the missed transmission (e.g., SINR(s) and/or LLR(s)). At 1308, the UE 120a sends the NACK and additional decoding information to the PLC 1301. At 1310, the PLC 1301 determines whether the PLC 1304 or the BS 110a retransmit the transmission based on the decoding information. At 1312, based on the determination, the PLC 1301 sends the retransmission to the UE 120a (at 1312b) or the PLC 1301 indicates to the BS 110a to send the retransmission (at 1312a) and the BS 110a sends the retransmission at 1314.

According to certain aspects, a UE determines whether a retransmission is through a PLC or a BS, and the UE sends an indication with a NACK indicating the PLC or the BS to retransmit. For example, the UE may determine whether the PLC or the BS retransmits based on decoding information (e.g., one or more SINR(s), LLR(s)). The UE may send one additional bit to indicate to the PLC that the retransmission should go through the PLC or through the BS. The one additional bit may be sent along with the NACK to the PLC. The BS can send (e.g., configure, indicate) the UE with one or more thresholds (e.g., SINR and/or LLR thresholds) to determine that the retransmission should go through the PLC or through the BS. The threshold can be send using a MAC-CE or using a PDCCH.

Figure 13B:
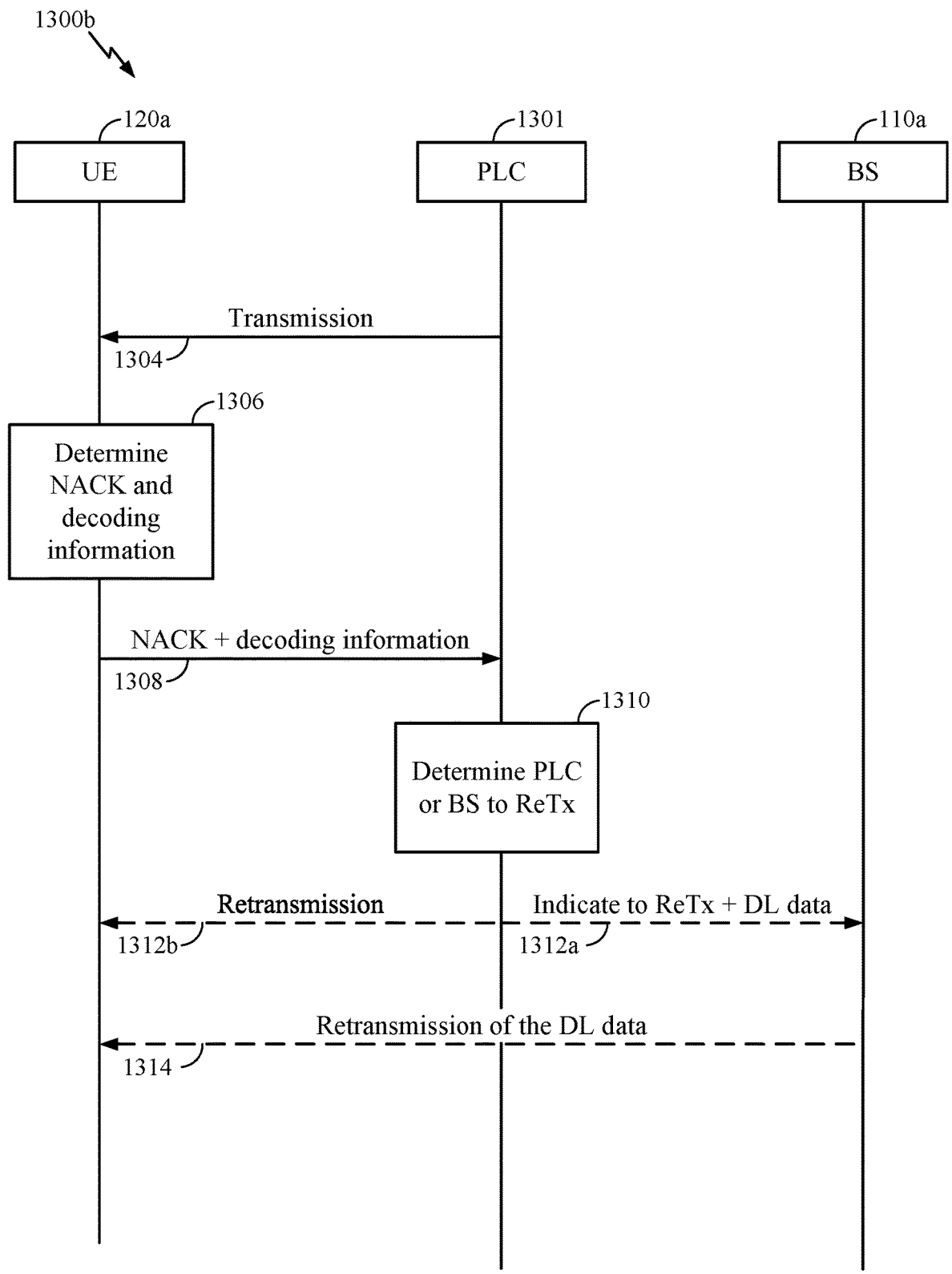

FIG. 13B is a call flow diagram illustrating example signaling 1300b for a fallback retransmission for a sidelink, in accordance with aspects of the present disclosure. As shown in FIG. 13B, an initial transmission may originate at a PLC 1301 (e.g., rather than forwarded from a BS 110a), at 1304. In this case, when the PLC 1301 determines, at 1310, that the BS 110a sends a retransmission, then the PLC 1301 further provides the BS 110a with data to be retransmitted (e.g., at 1312a).

Figure 13C:
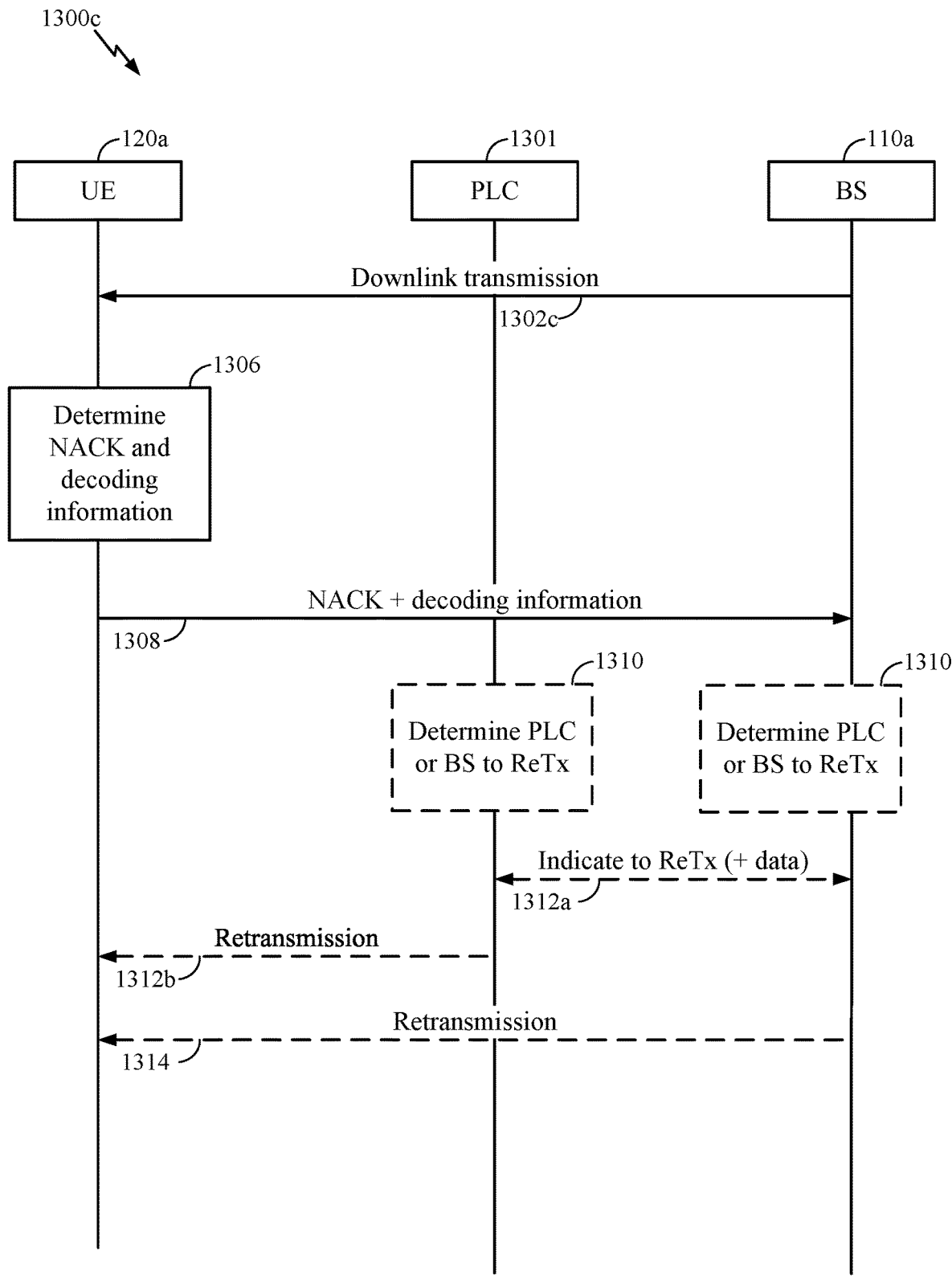

FIG. 13C is a call flow diagram illustrating example signaling 1300c for a fallback retransmission for a sidelink, in accordance with aspects of the present disclosure. As shown in FIG. 13C, an initial transmission may be transmitted to a UE 120a directly from a BS 110a (e.g., rather than forwarded by a PLC 1301), at 1302. In this case, the UE 120a may send a NACK and decoding information to the PLC 1301 or to the BS 110a, at 1308. Thus, at 1310, either the PLC 1301 or the BS 110a may determine whether the PLC 1304 or the BS 110a sends the retransmission. When the PLC 1301 sends the retransmission, then the BS 110a further provides the PLC 1301 with data to be retransmitted (e.g., at 1312a).

Figure 14A:
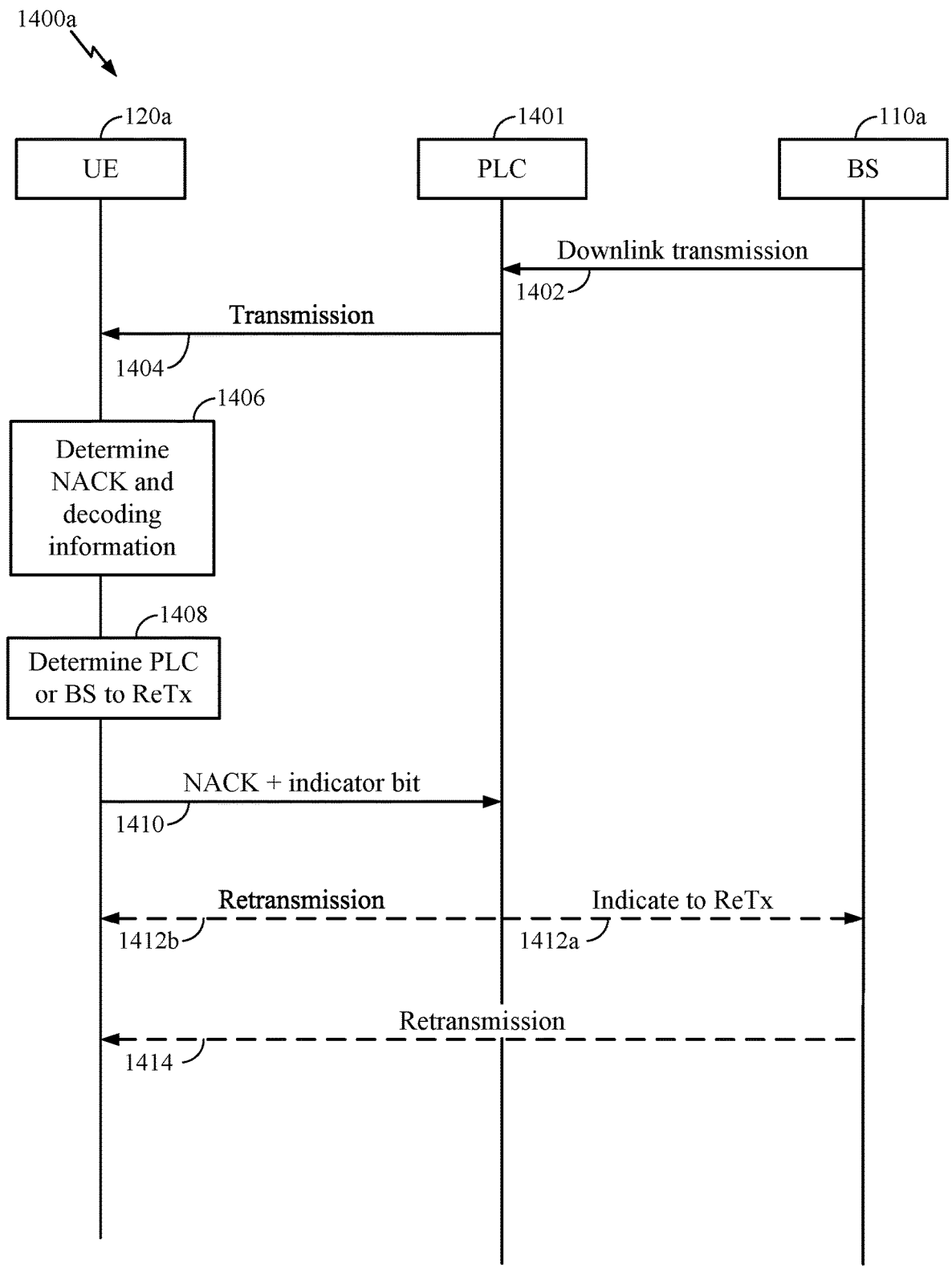
FIGS. 14A-C are call flow diagrams illustrating example signaling for a fallback retransmission in a sidelink, in accordance with certain aspects of the present disclosure.

FIG. 14A is a call flow diagram illustrating example signaling 1400a for a fallback retransmission for a sidelink, in accordance with aspects of the present disclosure. As shown in FIG. 14A, at 1404, a UE (e.g., such as the UE 120a of FIG. 1) may not successful decode a transmission from a BS (e.g., such as the BS 110a of FIG. 1), which may be forwarded by a PLC 1401 at 1402. At 1406, the UE 120a may determine that the transmission was not received (e.g., to send a NACK) and decoding information associated with the missed transmission (e.g., SINR(s) and/or LLR(s)). At 1408, the UE 120a determines whether the PLC 1401 or the BS 110a retransmit the transmission based on the decoding information. At 1410, the UE 120a sends the NACK and an additional indicator bit to the PLC 1401. At 1412, based on the indicator bit, the PLC 1401 sends the retransmission to the UE 120a (at 1412b) or the PLC 1401 indicates to the BS 110a to send the retransmission (at 1412a) and the BS 110a sends the retransmission to the UE 120a (at 1414).

Figure 14B:
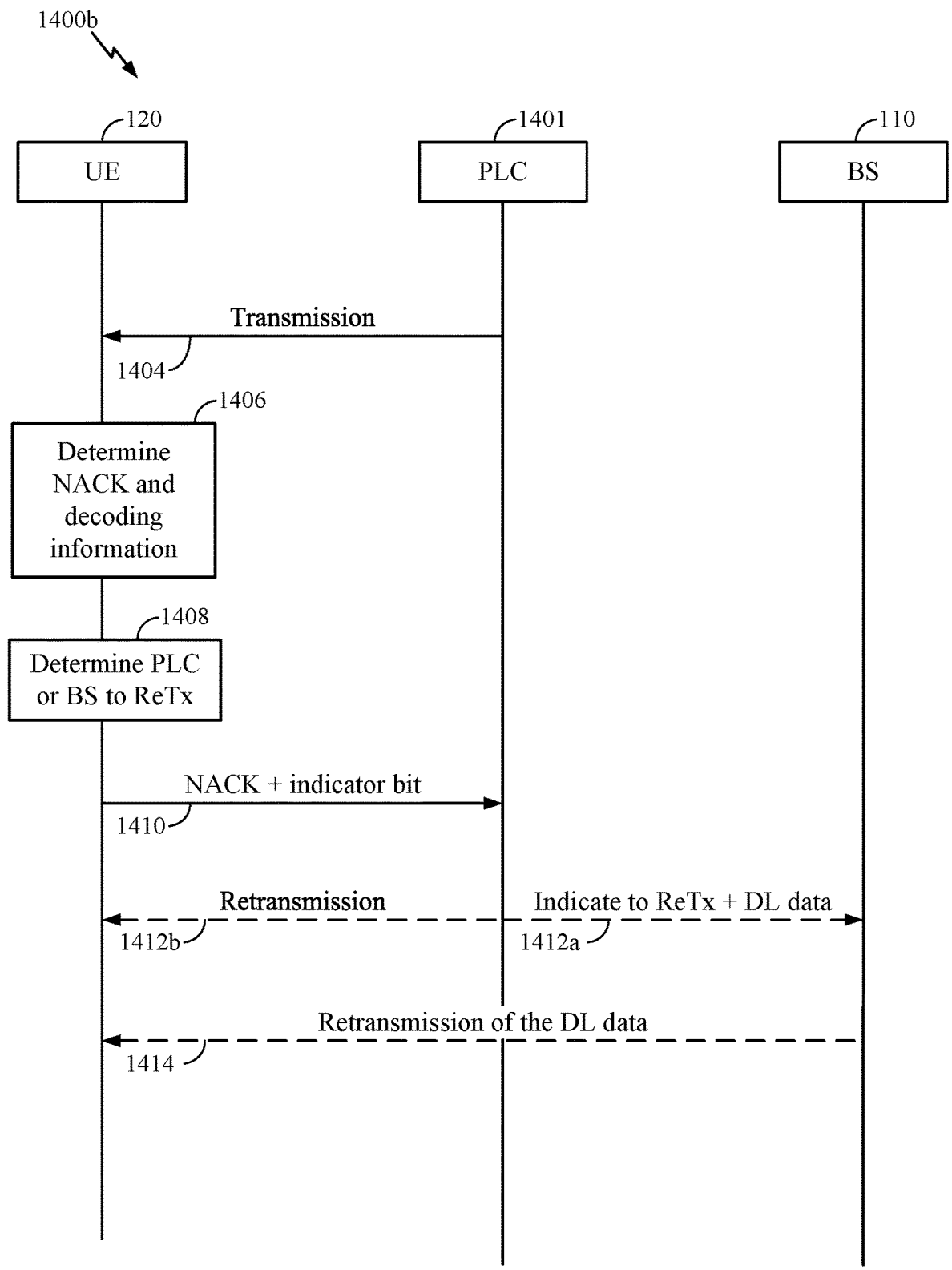

FIG. 14B is a call flow diagram illustrating example signaling 1400b for a fallback retransmission for a sidelink, in accordance with aspects of the present disclosure. As shown in FIG. 14B, an initial transmission may originate at a PLC 1401 (e.g., rather than forwarded from a BS 110a), at 1404. In this case, when the UE 120a indicates, at 1410, that the BS 110a sends a retransmission, then the PLC 1401 further provides the BS 110a with data to be retransmitted (e.g., at 1412a).

Figure 14C:
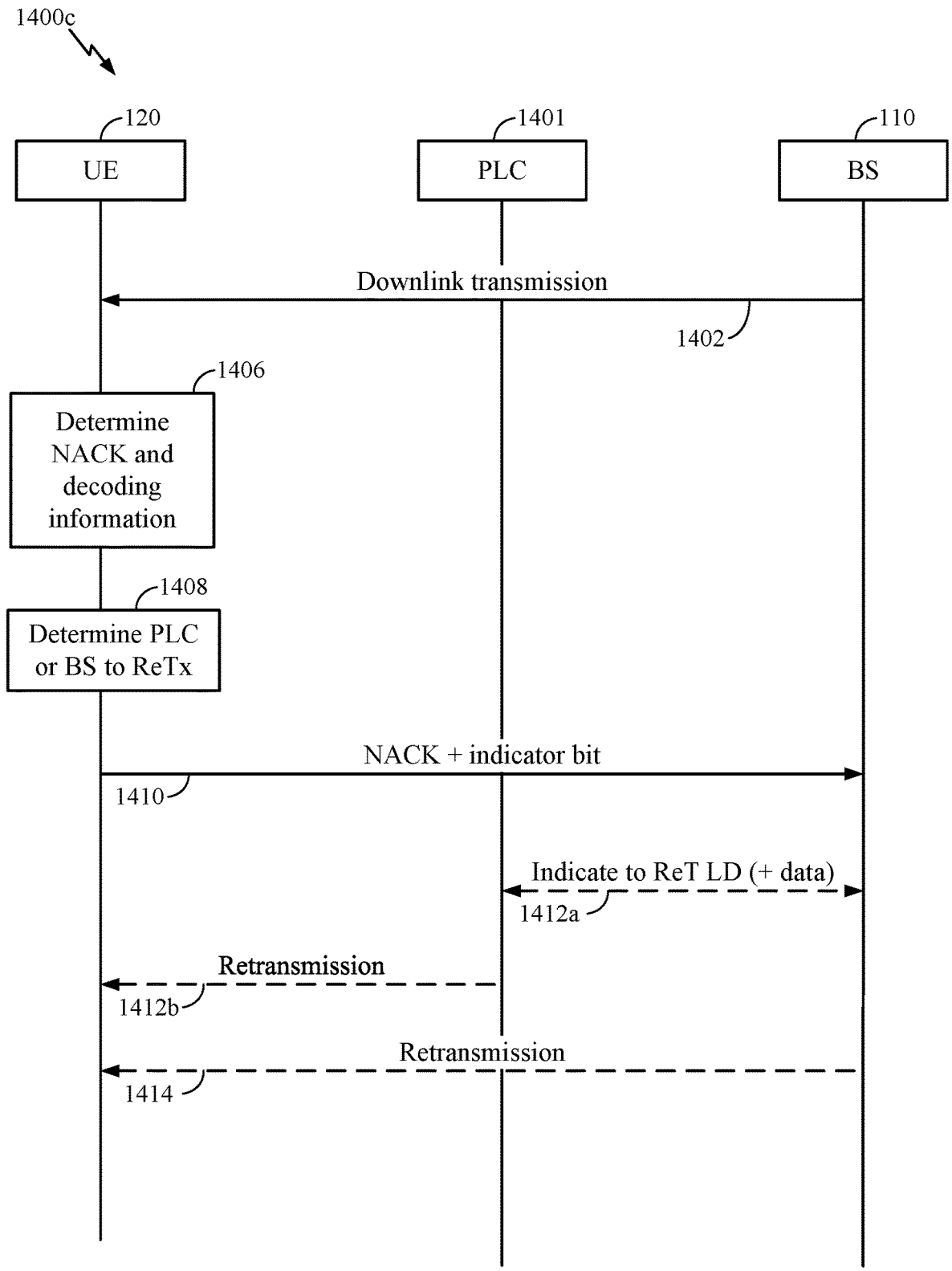

FIG. 14B is a call flow diagram illustrating example signaling 1400c for a fallback retransmission for a sidelink, in accordance with aspects of the present disclosure. As shown in FIG. 14C, an initial transmission may be transmitted to a UE 120a directly from a BS 110a (e.g., rather than forwarded by a PLC 1401), at 1402. In this case, the UE 120a may send a NACK and an indicator bit to the PLC 1401 or to the BS 110a, at 1410. When the PLC 1401 sends a retransmission, then the BS 110a further provides the PLC 1401 with data to be retransmitted (e.g., at 1412a).

Figure 15:
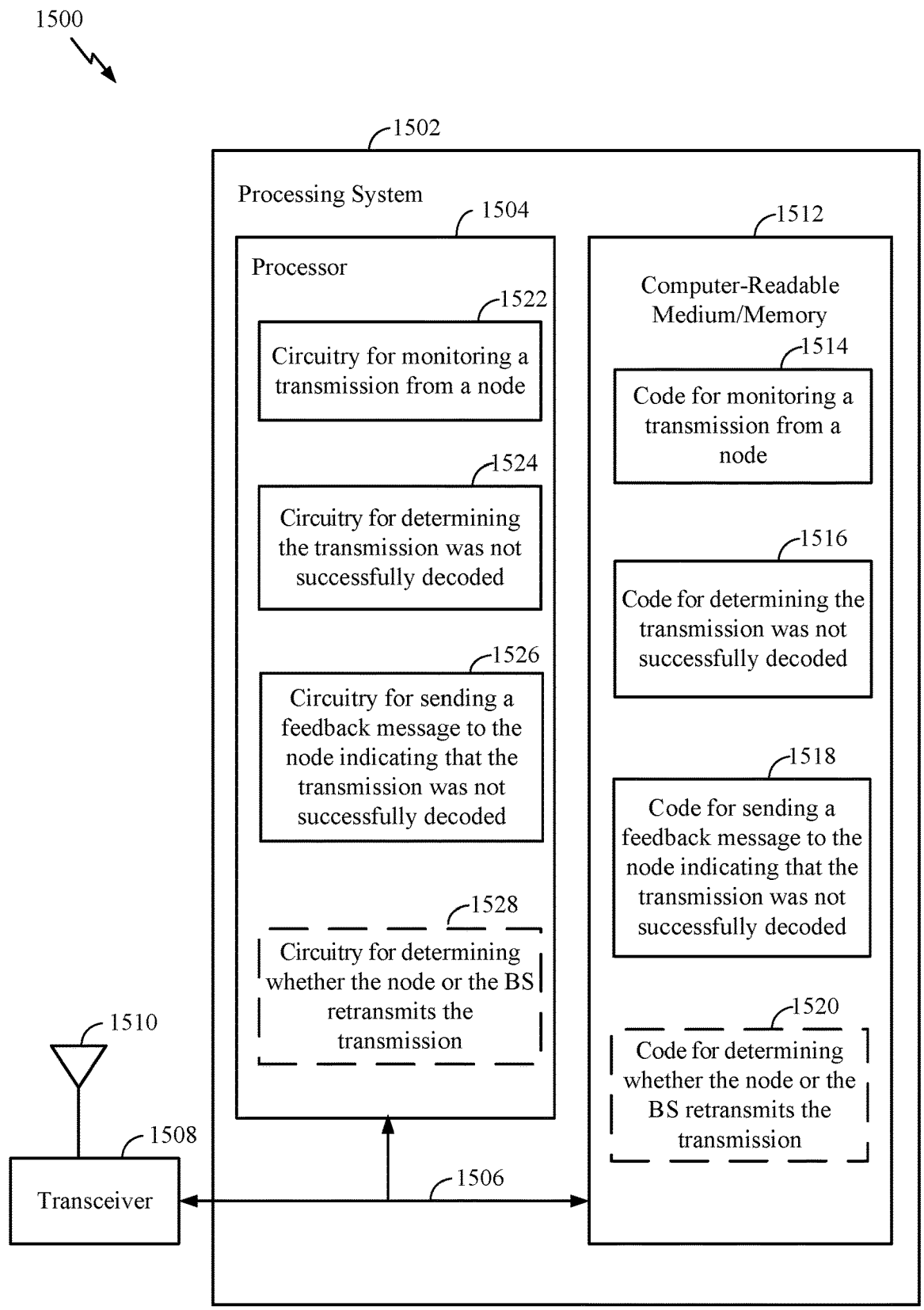
FIG. 15 illustrates a communications device that may include various components configured to perform operations for the techniques disclosed herein in accordance with certain aspects of the present disclosure.

FIG. 15 illustrates a communications device 1500 that may include various components (e.g., corresponding to means-plus-function components) configured to perform operations for the techniques disclosed herein, such as the operations illustrated in FIG. 10. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 10, or other operations for performing the various techniques discussed herein for a fallback retransmission in a sidelink. In certain aspects, computer-readable medium/memory 1512 stores code 1514 for monitoring a transmission from a node; code 1516 for determining that the transmission was not successfully decoded; code 1518 for sending a feedback message to the node indicating that the transmission was not successfully decoded, wherein the feedback message further indicates whether the node or a BS retransmits the transmission; and/or code 1520 for determining whether the node or the BS retransmits the transmission, in accordance with aspects of the present disclosure.

In certain aspects, the processor 1504 has circuitry configured to implement the code stored in the computer-readable medium/memory 1512. The processor 1504 includes circuitry 1522 for monitoring a transmission from a node; circuitry 1524 for determining that the transmission was not successfully decoded; circuitry 1526 for sending a feedback message to the node indicating that the transmission was not successfully decoded, wherein the feedback message further indicates whether the node or a BS retransmits the transmission; and/or circuitry 1528 for determining whether the node or the BS retransmits the transmission; in accordance with aspects of the present disclosure.

Figure 16:
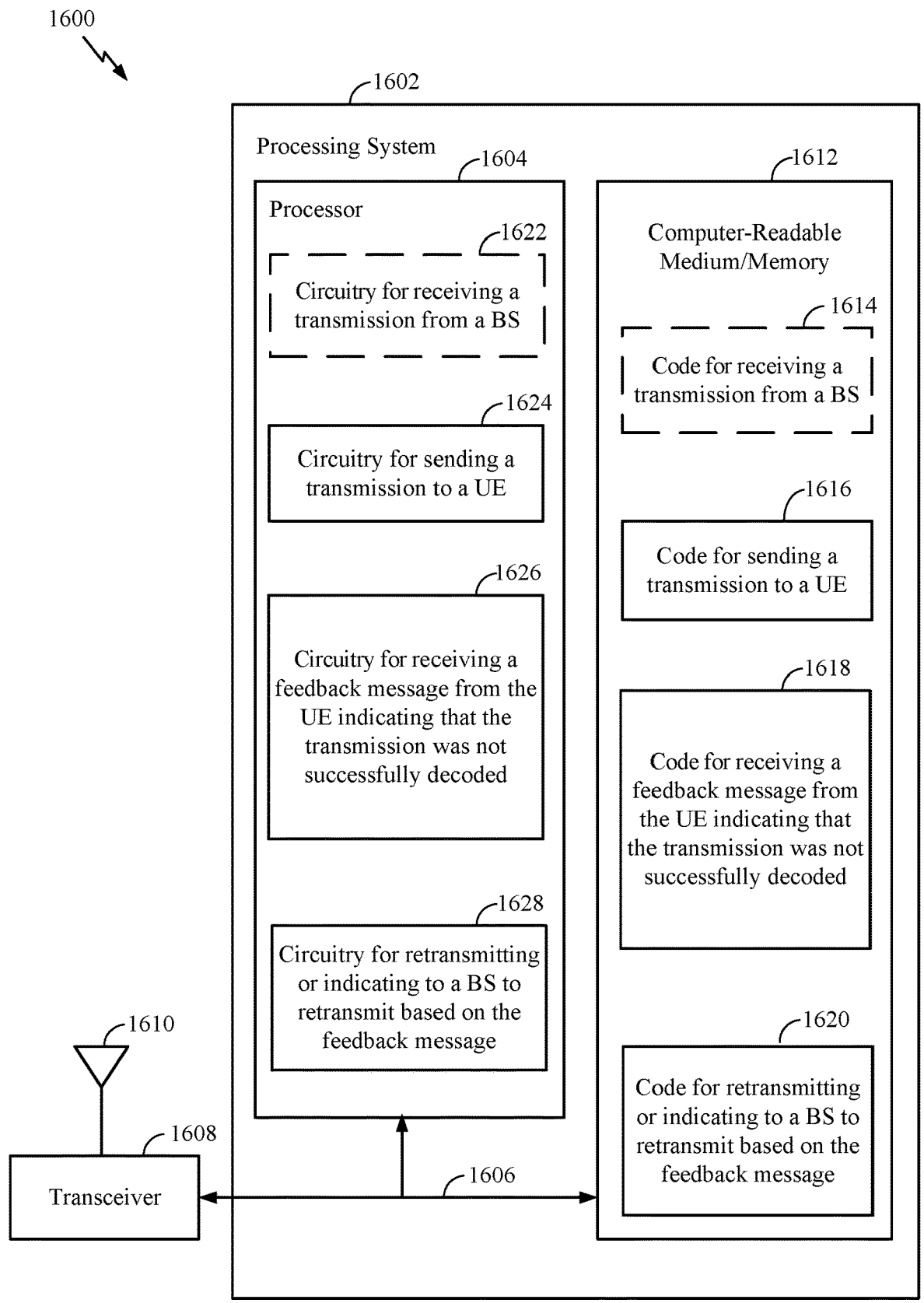
FIG. 16 illustrates a communications device that may include various components configured to perform operations for the techniques disclosed herein in accordance with certain aspects of the present disclosure.

FIG. 16 illustrates a communications device 1600 that may include various components (e.g., corresponding to means-plus-function components) configured to perform operations for the techniques disclosed herein, such as the operations illustrated in FIG. 11. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 11, or other operations for performing the various techniques discussed herein for a fallback retransmission in a sidelink. In certain aspects, computer-readable medium/memory 1612 stores code 1614 for receiving a transmission from a BS; code 1616 for sending a transmission to a UE; code 1618 for receiving a feedback message from the UE indicating that the transmission was not successfully decoded, wherein the feedback message further indicates whether the node or a BS retransmits the transmission; and/or code 1620 for retransmitting the transmission or indicating to the BS to retransmit based on the feedback message, in accordance with aspects of the present disclosure.

In certain aspects, the processor 1604 has circuitry configured to implement the code stored in the computer-readable medium/memory 1612. The processor 1604 includes circuitry 1622 for receiving a transmission from a BS; circuitry 1624 for sending a transmission to a UE; circuitry 1626 for receiving a feedback message from the UE indicating that the transmission was not successfully decoded, wherein the feedback message further indicates whether the node or a BS retransmits the transmission; and/or circuitry 1628 for retransmitting the transmission or indicating to the BS to retransmit based on the feedback message, in accordance with aspects of the present disclosure.

Figure 17:
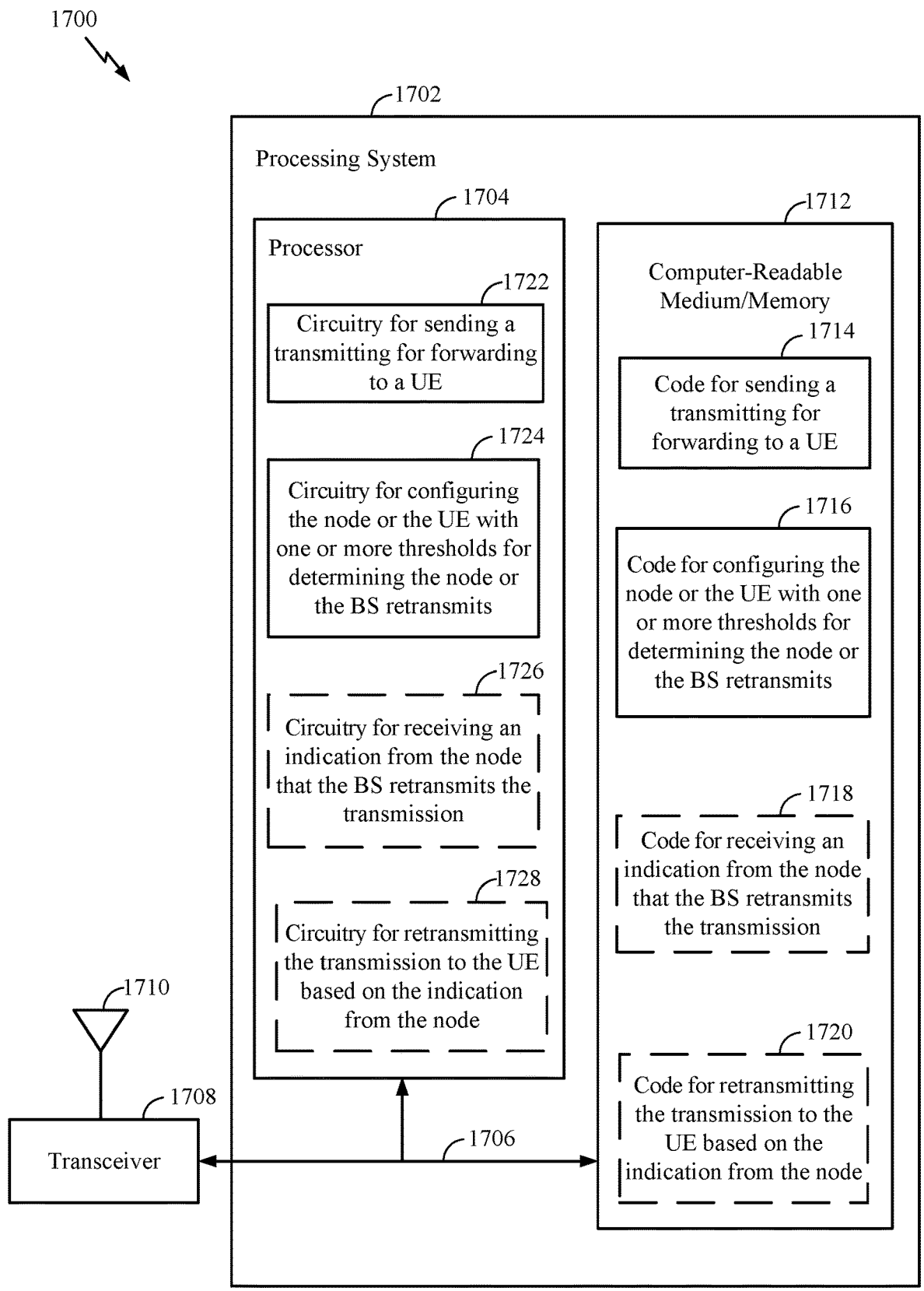
FIG. 17 illustrates a communications device that may include various components configured to perform operations for the techniques disclosed herein in accordance with certain aspects of the present disclosure.

FIG. 17 illustrates a communications device 1700 that may include various components (e.g., corresponding to means-plus-function components) configured to perform operations for the techniques disclosed herein, such as the operations illustrated in FIG. 12. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIG. 12, or other operations for performing the various techniques discussed herein for a fallback retransmission in a sidelink. In certain aspects, computer-readable medium/memory 1712 stores code 1714 for sending a transmission to a node for forwarding to a UE; code 1716 for configuring the node, the UE, or both with one or more thresholds for determining whether the node or the BS retransmits the transmission; code 1718 for receiving an indication from the node that the BS retransmits the transmission; and/or code 1720 for retransmitting the transmission to the UE based on the indication from the code, in accordance with aspects of the present disclosure.

In certain aspects, the processor 1704 has circuitry configured to implement the code stored in the computer-readable medium/memory 1712. The processor 1704 includes circuitry 1722 for sending a transmission to a node for forwarding to a UE; circuitry 1724 for configuring the node, the UE, or both with one or more thresholds for determining whether the node or the BS retransmits the transmission; circuitry 1726 for receiving an indication from the node that the BS retransmits the transmission; and/or circuitry 1728 for retransmitting the transmission to the UE based on the indication from the code, in accordance with aspects of the present disclosure.

Example Aspects

Implementation examples are described in the following numbered aspects.

In a first aspect, a method for wireless communication by a user equipment (UE), comprising: monitoring a transmission from a node; determining that the transmission was not successfully decoded; and sending a feedback message to the node indicating that the transmission was not successfully decoded, wherein the feedback message further indicates whether the node or a base station (BS) retransmits the transmission.

In a second aspect, alone or in combination with the first aspect, the feedback message comprises decoding information for the transmission, the decoding information indicating whether the node or the BS retransmits the transmission.

In a third aspect, alone or in combination with one or more of the first and second aspects, determining whether the node or BS retransmits the transmission; and the feedback message comprises a bit indicating, based on the determination, whether the node or the BS retransmits the transmission.

In a fourth aspect, alone or in combination with one or more of the first through third aspects, determining whether the node or BS retransmits the transmission based on decoding information for the transmission.

In a fifth aspect, alone or in combination with one or more of the first through fourth aspects, receiving an indication from the BS of one or more signal-to-interference-plus-noise ratio (SINR) thresholds, one or more log-likelihood ratio (LLR) thresholds, or both; and determining whether the node or BS retransmits the transmission further based on the one or more thresholds.

In a sixth aspect, alone or in combination with one or more of the first through fifth aspects, when the decoding information satisfies a threshold, indicating a better decoding performance, determining the node retransmits the transmission; and when the decoding information fails to satisfy the threshold, indicating a worse decoding performance, determining the BS retransmits the transmission.

In a seventh aspect, alone or in combination with one or more of the first through sixth aspects, the UE comprises an industrial Internet-of-things (IIOT) device; the UE comprises a sensor/actuator; the node comprises a programmable logical controller (PLC); or a combination thereof.

In an eighth aspect, alone or in combination with one or more of the first through seventh aspects, the transmission comprises a semi-persistent scheduled (SPS) transmission on a sidelink.

In a ninth aspect, a method for wireless communication by a node, comprising: sending a transmission to a user equipment (UE); receiving a feedback message from the UE indicating that the transmission was not successfully decoded, wherein the feedback message further indicates whether the UE or a base station (BS) retransmits the transmission; and based on the feedback message, retransmitting the transmission or indicate to the BS to retransmit the transmission.

In a tenth aspect, alone or in combination with the ninth aspect, sending the transmission to the UE comprises receiving the transmission from the BS; and forwarding the transmission to the UE.

In an eleventh aspect, alone or in combination with one or more of the ninth and tenth aspects, sending the transmission to the UE comprises generating the transmission; and providing data associated with the transmission to the BS when the node indicates to the BS to retransmit.

In a twelfth aspect, alone or in combination with one or more of the ninth through eleventh aspects, the feedback message comprises decoding information for the transmission; and determining whether the UE or BS retransmits the transmission based on the decoding information.

In a thirteenth aspect, alone or in combination with one or more of the ninth through twelfth aspects, receiving an indication of one or more thresholds from the BS; and determining whether the node or BS retransmits the transmission further based on the one or more thresholds.

In a fourteenth aspect, alone or in combination with one or more of the ninth through thirteenth aspects, determining whether the node or BS retransmits the transmission comprises: when the decoding information satisfies a threshold, indicating a better decoding performance, determining the node retransmits the transmission; and when the decoding information fails to satisfy the threshold, indicating a worse decoding performance, determining the BS retransmits the transmission.

In a fifteenth aspect, alone or in combination with one or more of the ninth through fourteenth aspects, the feedback message comprises one bit indicating whether the UE or the BS retransmits the transmission.

In a sixteenth aspect, alone or in combination with one or more of the ninth through fifteenth aspects, the node comprises a programmable logic controller (PLC).

In a seventeenth aspect, a method for wireless communication by a base station (BS), comprising: sending a transmission to a node for forwarding to a user equipment (UE); and configuring the node, the UE, or both with one or more thresholds for determining whether the node or the BS retransmits the transmission.

In an eighteenth aspect, alone or in combination with the seventeenth aspect, receiving an indication from the node that the BS retransmits the transmission; and retransmitting the transmission to the UE based on the indication from the node.

In a nineteenth aspect, alone or in combination with one or more of the seventeenth and eighteenth aspects, the one or more thresholds comprise one or more thresholds for one or more decoding information values associated with the transmission.

In a twentieth aspect, alone or in combination with one or more of the seventeenth through nineteenth aspects, the one or more thresholds comprise one or more signal-to-interference-plus-noise ratio (SINR) thresholds, one or more log-likelihood ratio (LLR) thresholds, or both.

In a twenty-first aspect, alone or in combination with one or more of the seventeenth through twentieth aspects, determining the node retransmits the transmission when the one or more decoding information values satisfies a threshold, indicating a better decoding performance; and determining the BS retransmits the transmission when the one or more decoding information values fails to satisfy the threshold, indicating a worse decoding performance.

In a twenty-second aspect, alone or in combination with one or more of the seventeenth through twenty-first aspects, the one or more thresholds are configured via a medium access control (MAC) control element or a physical downlink control channel (PDCCH).

In a twenty-third aspect, alone or in combination with one or more of the seventeenth through twenty-two aspects, the UE comprises a sensor/actuator or an industrial Internet-of-things (IIOT) device; and the node comprises a programmable logical controller (PLC).

An apparatus for wireless communication, comprising at least one processor; and a memory coupled to the at least one processor, the memory comprising code executable by the at least one processor to cause the apparatus to perform the method of any of the first through twenty-third aspects.

An apparatus comprising means for performing the method of any of the first through twenty-third aspects.

A computer readable medium storing computer executable code thereon for wireless communications that, when executed by at least one processor, cause an apparatus to perform the method of any of the first through twenty-third aspects.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 10-12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication, comprising:
at least one processor; and
a memory coupled to the at least one processor, the memory comprising code executable by the at least one processor to cause the apparatus to:
monitor a transmission from a node;
determine that the transmission was not successfully decoded; and
send a feedback message to the node, wherein the feedback message includes a negative acknowledgment (NACK) indicating that the transmission was not successfully decoded, and wherein the feedback message further includes one or more log-likelihood ratios (LLRs) for the transmission indicating whether the node or a base station (BS) retransmits the transmission.

2. An apparatus for wireless communication, comprising:
at least one processor; and
a memory coupled to the at least one processor, the memory comprising code executable by the at least one processor to cause the apparatus to:
monitor a transmission from a node;
determine that the transmission was not successfully decoded; and
send a feedback message to the node indicating that the transmission was not successfully decoded, wherein the feedback message further indicates whether the node or a base station (BS) retransmits the transmission, wherein: the memory further comprises code executable by the at least one processor to cause the apparatus to determine whether the node or the BS retransmits the transmission, the feedback message comprises a bit indicating, based on the determination of whether the node or the BS retransmits the transmission, whether the node or the BS retransmits the transmission,
the memory further comprises code executable by the at least one processor to cause the apparatus to determine whether the node or the BS retransmits the transmission based on decoding information for the transmission, and
the memory further comprises code executable by the at least one processor to cause the apparatus to:
receive an indication from the BS of one or more signal-to-interference-plus-noise ratio (SINR) thresholds, one or more log-likelihood ratio (LLR) thresholds, or both; and
determine whether the node or the BS retransmits the transmission further based on the one or more SINR thresholds, the one or more LLR thresholds, or both.

3. The apparatus of claim 2, wherein the memory further comprises code executable by the at least one processor to cause the apparatus to:
when the decoding information satisfies a threshold of the one or more SINR thresholds, the one or more LLR thresholds, or both, indicating a better decoding performance, determine that the node retransmits the transmission; and
when the decoding information fails to satisfy the threshold, indicating a worse decoding performance, determine that the BS retransmits the transmission.

4. The apparatus of claim 2, wherein:
the apparatus comprises an industrial Internet-of-things (IIOT) device;
the apparatus comprises a sensor/actuator;
the node comprises a programmable logical controller (PLC); or
a combination thereof.

5. The apparatus of claim 2, wherein:
the apparatus and the node communicate via a cellular link, a sidelink, or both; and
the transmission comprises a semi-persistent scheduled (SPS) transmission on a sidelink.

6. An apparatus for wireless communication, comprising:
at least one processor; and
a memory coupled to the at least one processor, the memory comprising code executable by the at least one processor to cause the apparatus to:
send a transmission to a user equipment (UE);
receive a feedback message from the UE, wherein the feedback message includes a negative acknowledgment (NACK) indicating that the transmission was not successfully decoded, and wherein the feedback message further includes decoding information for the transmission indicating whether the apparatus or a base station (BS) retransmits the transmission; and
based on the feedback message, retransmit the transmission or indicate to the BS to retransmit the transmission, wherein:
the memory further comprises code executable by the at least one processor to cause the apparatus to determine whether the apparatus or the BS retransmits the transmission based on the decoding information for the transmission, and wherein:
the memory further comprises code executable by the at least one processor to cause the apparatus to:
receive an indication of one or more thresholds from the BS; and
determine whether the apparatus or the BS retransmits the transmission further based on the one or more thresholds.

7. The apparatus of claim 6, wherein the code executable by the at least one processor to cause the apparatus to send the transmission to the UE comprises code executable by the at least one processor to cause the apparatus to:
receive the transmission from the BS; and
forward the transmission to the UE.

8. The apparatus of claim 6, wherein:
the code executable by the at least one processor to cause the apparatus to send the transmission to the UE comprises code executable by the at least one processor to cause the apparatus to generate the transmission; and
the memory further comprises code executable by the at least one processor to cause the apparatus to provide data associated with the transmission to the BS when the BS is to retransmit the transmission.

9. The apparatus of claim 8, wherein the code executable by the at least one processor to cause the apparatus to determine whether the apparatus or the BS retransmits the transmission further based on the one or more thresholds comprises code executable by the at least one processor to cause the apparatus to:
when the decoding information satisfies a threshold of the one or more thresholds, indicating a better decoding performance, determine that the apparatus retransmits the transmission; and
when the decoding information fails to satisfy the threshold, indicating a worse decoding performance, determine that the BS retransmits the transmission.

10. The apparatus of claim 6, wherein the apparatus comprises a programmable logic controller (PLC).

11. An apparatus for wireless communication, comprising:
at least one processor; and
a memory coupled to the at least one processor, the memory comprising code executable by the at least one processor to cause the apparatus to:
send a transmission, destined for a user equipment (UE), to a node;
configure the node, the UE, or both with one or more thresholds for whether the node or the apparatus retransmits the transmission to the UE, wherein the one or more thresholds include one or more thresholds for one or more decoding information values associated with the transmission; and
configure the UE, the node, or both to:
determine that the node retransmits the transmission to the UE when the one or more decoding information values satisfies a threshold of the one or more thresholds for the one or more decoding information values, indicating a better decoding performance; and
determine that the apparatus retransmits the transmission to the UE when the one or more decoding information values fails to satisfy the threshold, indicating a worse decoding performance.

12. The apparatus of claim 11, wherein the memory further comprises code executable by the at least one processor to cause the apparatus to:
receive an indication from the node that the apparatus retransmits the transmission; and
retransmit the transmission to the UE based on the indication from the node.

13. The apparatus of claim 11, wherein the one or more thresholds for the one or more decoding information values comprise one or more signal-to-interference-plus-noise ratio (SINR) thresholds, one or more log-likelihood ratio (LLR) thresholds, or both.

14. The apparatus of claim 11, wherein the one or more thresholds for the one or more decoding information values are configured via a medium access control (MAC) control element or a physical downlink control channel (PDCCH).

15. The apparatus of claim 11, wherein:
the apparatus comprises a base station (BS);
the UE comprises a sensor/actuator or an industrial Internet-of-things (IIOT) device; and
the node comprises a programmable logical controller (PLC).

16. A method of wireless communication by a user equipment (UE), comprising:
monitoring a transmission from a node;
determining that the transmission was not successfully decoded; and sending a feedback message to the node, wherein the feedback message includes a negative acknowledgment (NACK) indicating that the transmission was not successfully decoded, and wherein the feedback message further includes one or more log-likelihood ratios (LLRs) for the transmission indicating whether the node or a base station (BS) retransmits the transmission.

17. The method of claim 16, wherein the feedback message further includes one or more signal-to-interference-plus-noise ratio (SINR) values.

18. A method of wireless communication by a user equipment (UE), comprising:
  monitoring a transmission from a node;
  determining that the transmission was not successfully decoded; and
  sending a feedback message to the node indicating that the transmission was not successfully decoded, wherein the feedback message further indicates whether the node or a base station (BS) retransmits the transmission, the method further comprising:
  determining whether the node or the BS retransmits the transmission based on decoding information for the transmission, wherein the feedback message comprises an indication of whether the node or the BS retransmits the transmission based on the determination of whether the node or the BS retransmits the transmission, and the method further comprising:
  receiving an indication of one or more signal-to-interference-plus-noise ratio (SINR) thresholds, one or more log-likelihood ratio (LLR) thresholds, or both from the BS, wherein the determination of whether the node or the BS retransmits the transmission is further based on the one or more SINR thresholds, the one or more LLR thresholds, or both.

19. The method of claim 18, wherein the determining whether the node or the BS retransmits the transmission based on decoding information for the transmission comprises:
  when the decoding information satisfies a threshold of the one or more SINR thresholds, the one or more LLR thresholds, or both, indicating a better decoding performance, determining that the node retransmits the transmission; and
  when the decoding information fails to satisfy the threshold, indicating a worse higher decoding performance, determining the BS retransmits the transmission.

* * * * *